(12) United States Patent
Faler et al.

(10) Patent No.: US 7,001,952 B2
(45) Date of Patent: Feb. 21, 2006

(54) COATING COMPOSITIONS CONTAINING POLYURETHANE DISPERSIONS AND HIGHLY CROSSLINKED POLYMER PARTICLES

(75) Inventors: Dennis L. Faler, Glenshaw, PA (US); Karen A. Barkac, North Huntingdon, PA (US); M. Frank Haley, Glenshaw, PA (US); Deena M. McHenry, Cranberry Township, PA (US); Edward S. Pagac, Portersville, PA (US); Shanti Swarup, Allison Park, PA (US); Cathy A. Taylor, Allison Park, PA (US); Elizabeth A. Zezinka, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 505 days.

(21) Appl. No.: 10/126,903

(22) Filed: Apr. 19, 2002

(65) Prior Publication Data

US 2003/0220446 A1    Nov. 27, 2003

(51) Int. Cl.
C08F 12/34    (2006.01)

(52) U.S. Cl. ............... 525/185; 428/423.3; 428/425.8; 428/423.1; 525/123

(58) Field of Classification Search ............... 525/185, 525/123; 428/423.3, 425.8, 423.1
See application file for complete search history.

(56) References Cited

U.S. PATENT DOCUMENTS

| | | | |
|---|---|---|---|
| 3,479,328 A | 11/1969 | Nordstrom | 526/312 |
| 3,799,854 A | 3/1974 | Jerabek | 428/425.8 |
| 4,001,156 A | 1/1977 | Bosso et al. | 523/421 |
| 4,046,729 A | 9/1977 | Scriven et al. | 524/589 |
| 4,147,679 A | 4/1979 | Scriven et al. | 523/404 |
| 4,220,679 A | 9/1980 | Backhouse | 427/401 |
| 4,403,003 A | 9/1983 | Backhouse | 427/407.1 |
| 4,681,811 A | 7/1987 | Simpson et al. | 428/413 |
| 4,705,821 A | 11/1987 | Ito et al. | 524/407 |
| 4,728,545 A | 3/1988 | Kurauchi et al. | 427/409 |
| 4,732,790 A | 3/1988 | Blackburn et al. | 427/407.1 |
| 4,777,213 A | 10/1988 | Kanda et al. | 525/114 |
| 4,798,746 A | 1/1989 | Claar et al. | 427/407.1 |
| 4,880,867 A | 11/1989 | Gobel et al. | 524/507 |
| 5,071,904 A | 12/1991 | Martin et al. | 524/458 |
| 5,084,541 A | 1/1992 | Jacobs, III et al. | 528/45 |
| 5,098,947 A | 3/1992 | Metzger et al. | 524/507 |
| 5,102,925 A | 4/1992 | Suzuki et al. | 523/500 |
| 5,196,485 A | 3/1993 | McMonigal et al. | 525/327.3 |
| 5,212,273 A | 5/1993 | Das et al. | 526/323.1 |
| 5,569,715 A | 10/1996 | Grandhee | 525/7 |
| 5,593,733 A | 1/1997 | Mayo | 427/407.2 |
| 5,663,240 A | 9/1997 | Simeone et al. | 525/327.3 |
| 5,786,420 A | 7/1998 | Grandhee | 525/7 |
| 5,969,030 A | 10/1999 | Grandhee | 524/457 |
| 6,025,031 A | 2/2000 | Lettmann et al. | 427/388.4 |
| 6,281,272 B1 | 8/2001 | Baldy et al. | 523/501 |
| 6,291,564 B1 | 9/2001 | Faler et al. | 524/284 |
| 6,329,020 B1 | 12/2001 | Patzschke et al. | 427/407.1 |

FOREIGN PATENT DOCUMENTS

| | | |
|---|---|---|
| EP | 0 216 479 | 4/1987 |
| EP | 0 358 221 | 3/1990 |
| WO | 95/09890 | 4/1995 |

OTHER PUBLICATIONS

Grant, R., Grant, C., eds., Grant & Hackh's Chemical Dictionary, 5$^{th}$ ed., McGraw-Hill Book Company, New York, 1987, p. 25.*

Hong et al., "Core/Shell Acrylic Microgel as the Main Binder of Waterborne Metallic Basecoats," *Korea Polymer Journal*, vol. 7, No. 4, pp. 213-222, 1999.

Odian, George, *Principles of Polymerization*, Second Edition, John Wiley & Sons, New York, NY, pp. 319-331, 1983.

* cited by examiner

Primary Examiner—Melanie Bissett
(74) Attorney, Agent, or Firm—Deborah M. Altman

(57) ABSTRACT

An aqueous polyurethane dispersion and thermosetting compositions containing them. The aqueous polyurethane dispersion includes an aqueous medium with dispersed polyurethane-acrylate particles, which include the reaction product obtained by polymerizing a pre-emulsion formed from hydrophobic polymerizable ethylenically unsaturated monomers, a crosslinking monomer, and an active hydrogen-containing polyurethane acrylate prepolymer, which is a reaction product obtained by reacting a polyol, a polymerizable, ethylenically unsaturated monomer containing at least one hydroxyl group, a compound that includes an alkyl group having at least one hydroxyl group and optionally a carboxylic acid group, and a polyisocyanate. The prepolymer includes at least 30 percent by weight of polyurethane acrylate prepolymers with at least one terminal ethylenic unsaturation at one end of the molecule, and at least one active hydrogen-containing group at the opposite end; and at least 10 percent by weight of prepolymers having at least one terminal ethylenic unsaturation at each end of the molecule.

57 Claims, No Drawings

COATING COMPOSITIONS CONTAINING POLYURETHANE DISPERSIONS AND HIGHLY CROSSLINKED POLYMER PARTICLES

This application is related to copending U.S. patent application Ser. No. 10/126,137 entitled "Highly Crosslinked Polymer Particles and Coating Compositions Containing the Same" of Shanti Swarup et al., also filed Apr, 19, 2002.

BACKGROUND OF THE INVENTION

1. Field of the Invention

The present invention relates to aqueous polyurethane dispersions and thermosetting compositions containing polyurethane dispersions and dispersions of crosslinked polymeric microparticles. More particularly, the present invention is directed to coating compositions containing aqueous polyurethane dispersions and crosslinked polymeric microparticles used in multi-component composite coating compositions such as primers, pigmented or colored basecoats, and/or transparent topcoats which provide good smoothness and appearance.

2. Background of the Invention

Over the past decade, there has been a concerted effort to reduce atmospheric pollution caused by volatile solvents which are emitted during painting processes. However, it is often difficult to achieve high quality, smooth coating finishes, such as are required in the automotive industry, without the inclusion of organic solvents which contribute greatly to flow and leveling of a coating.

Due to environmental concerns, volatile organic compounds ("VOCs") and/or hazardous air pollutants ("HAPs") have come under strict regulation by the government. Therefore, one of the major goals of the coatings industry is to minimize the use of organic solvents by formulating waterborne coating compositions which provide a smooth, high gloss appearance, as well as good physical properties including resistance to acid rain. Unfortunately, many waterborne coating compositions, particularly those containing metallic flake pigments, do not provide acceptable appearance properties because, inter alia, they can deposit as a rough film under conditions of low humidity. Although smooth films can be obtained if the humidity is controlled within narrow limits, this often is not possible in industrial applications without incurring considerable expense.

The paint application process in an automotive industrial paint shop consists of four steps: storage in a tank; circulation in pipelines; spraying via a bell and/or a spray gun nozzle; and film formation on the surface of the substrate. The shear rates active on the paint in each of the steps are quite different and require varying paint rheological properties for each step. To design proper paint viscosity in waterborne automotive coatings, a distinct rheology profile is needed to provide good sprayability, sag resistance and levelling properties simultaneously. In basecoat compositions, shear thinning flow behavior is usually preferred. In many cases, special rheology control agents are used in coating formulations to provide the desired flow behavior.

Microgels or crosslinked microparticles have been used in the paint industry to improve the rheological properties of coating compositions as well as the physical properties of the coating, such as tensile strength, solvent resistance, and gas permeability. A particular goal has been to provide good sprayability, sag resistance and leveling properties simultaneously. In basecoat paints, proper shear thinning flow behavior is required to achieve this goal.

Basecoat coating compositions containing "effect" or reflective pigments, such as metallic flake pigments e.g., aluminum flake and micaceous pigments have increased in popularity in recent years because of the "glamorous" and distinctive chromic effects they provide. In such coatings, orientation of the aluminum flakes parallel to the surface of the substrate produces a unique metallic effect often referred to as "flip-flop" or "flop". A higher flop effect provides a more desired, brighter metallic appearance having a high level of color transition or "travel" with changes in viewing angle. The rheological properties of the coating composition, especially as affected by microgels, can greatly impact the flop property by promoting proper metallic flake orientation.

U.S. Pat. No. 6,291,564 to Faler, et al. discloses an aqueous coating composition that includes a crosslinkable film-forming resin and polymeric microparticles. However, under certain application conditions, the coating compositions can provide less than optimal appearance properties when metallic flake pigments are included in the coating composition. For example, the coatings can be prone to mottling (that is, an uneven distribution of metal flakes in the cured film) and sometimes do not have a smooth appearance. Furthermore, the resulting aqueous coating may include an unacceptable level of HAPs in the form of organic solvents.

Hong et al., "Core/Shell Acrylic Microgel as the Main Binder of Waterborne Metalic Basecoats", *Korea Polymer Journal,* Vol. 7, No. 4, pp 213–222 (1999) discloses an alkali swellable core/shell acrylic microgel emulsions having a hydrophobic core and a shell that included low levels of 2-hydroxyethyl acrylate and/or methacrylic acid as well as up to 8% crosslinking monomer content. The microgels provide pseudoplastic or shear thinning behavior in aqueous metallic basecoats. Addition of an alkali is required to promote swelling of the microgel, which can be problematic in achieving reproducible rheological properties.

Polymeric microparticles may be prepared by latex emulsion polymerization, where a suitable crosslinking monomer is included in the dispersed, water insoluble monomer phase. The macroscopic interactions and kinetics of latex emulsion polymerizations are generally described by the Smith-Ewart model. In the latex emulsion polymerization technique, water-insoluble or slightly water-soluble monomers are added to an aqueous continuous phase and form dispersed monomer droplets. A very small fraction of the monomers go into solution and form monomer micelles. A free radical source is added to the emulsion and polymerization is initiated within the micelles, to which additional monomer is fed from the monomer droplets. The end result is polymer particles dispersed in an aqueous continuous phase. See *Principles of Polymerization,* Second Edition, Odian, Wiley-Interscience, pp. 319–331 (1983).

When water-soluble monomers are incorporated into the monomer mix in a latex emulsion polymerization process, initiation of polymerization in the aqueous continuous phase can result. When water-soluble monomers are polymerized in the aqueous continuous phase of a latex emulsion polymerization, the resulting polymer typically ranges from grit or coagulum to a thick solution or gel, rather than a dispersed polymer particle. The risk of such adverse results has limited the use of water-soluble monomers in latex emulsion polymerization processes.

U.S. Pat. No. 5,102,925 to Suzuki, et al. discloses an air-drying paint composition that includes internally cross-linked polymer microparticles, a film-forming resin and a volatile organic solvent. The use of thermosetting resins in the paint composition is not disclosed. The microparticles are produced by emulsion polymerization of ethylenically unsaturated monomers and at least one crosslinking monomer in the presence of an emulsifier.

U.S. Pat. No. 4,705,821 to Ito, et al. discloses an anticorrosive metal surface pretreating composition that includes an aqueous emulsion of hard polymer microparticles and a water soluble chromium compound. The polymer microparticles are prepared by emulsion polymerization of mono-unsaturated monomers and polyfunctional monomers.

European Patent Application No. 0 358 221 to Grutter et al. discloses electrodeposition coatings that include an aqueous dispersion of a cathodic or anodic deposition resin and polymer microparticles. The polymer microparticles include 0.1 to 5%, less than 2% by example, of monomers containing hydrophilic groups.

Generally, the known microgel thickeners used in aqueous basecoat coating compositions are deficient in that the resultant basecoatings can be susceptible to penetration by a solvent-based clear topcoat into the cured basecoat (commonly referred to as "soak in" or "strike in") and typically are only effective with certain limited clearcoats. Further, additional rheology modifiers or thickeners are often required to ensure a desired rheological profile for the cured coating composition, which also typically include HAPs solvents. Even with the additional rheology modifiers, these coating compositions can exhibit poor flow properties resulting in spray application difficulties and/or sagging upon application; moreover, these coatings can exhibit mottling, and/or a rough appearance.

In order to overcome the surface roughness of the coating, dispersions of hydrophobic polyurethanes have been added to coating compositions containing microgel thickeners in order to provide a smoother appearance. Polyurethane dispersions have been used in aqueous coating compositions as for example in U.S. Pat. No. 5,071,904 to Martin et al., which discloses a waterborne coating composition that includes a dispersion of polymeric microparticles of a hydrophobic polyurethane and is adapted to be chemically bound into the cured coating composition. The aqueous medium of the microparticle dispersion is substantially free of water-soluble polymer.

U.S. Pat. No. 4,880,867 to Gobel et al. discloses an aqueous coating composition that includes a film-forming material based on water dilutable binders which are a mixture of a hydroxyl group-containing polymer resin; a chain extended polyurethane dispersion and pigments.

U.S. Pat. No. 5,569,715 to Grandhee and U.S. Pat. No. 6,025,031 to Lettman et al. disclose coating compositions that include an aqueous dispersion, prepared in a single- or multi-stage method, of a hydrophilicized polymer resin based on a hydrophobic polyurethane resin. The coating composition is useful for the finishing of automobile bodies and plastics parts and for automotive refinishing.

U.S. Pat. No. 6,281,272 to Baldy et al. and U.S. Pat. No. 6,291,564 to Faler et al. disclose waterborne coating compositions that include a dispersion of polymeric microparticles. The microparticles are prepared by mixing monomer(s) and a chain-extended hydrophobic polyurethane together to form a pre-emulsion and particularized into microparticles by subjecting the pre-emulsion to high-shear stress using a homogenizer. The ethylenically unsaturated monomer(s) are then polymerized to form polymeric microparticles which are stably dispersed in the aqueous medium.

The polyurethane dispersions are useful for providing smoothness to the cured coating composition. However, the brightness of the coating is typically degraded, i.e., a coating containing the hydrophilic polyurethane dispersion will not be as bright as a coating that does not contain the hydrophilic polyurethane dispersion. This is especially true when effect pigments, such as those based on metal flakes, are used in the coating composition.

It would be desirable to provide a thermosetting waterborne coating composition that contains metallic flake pigments, which is useful as an original finish, contains low or no VOC or HAP materials, and has an optimal shear thinning flow profile while providing desirable appearance properties, to yield a smooth appearance, with high flip-flop, and no mottling.

SUMMARY OF THE INVENTION

The present invention is directed to an aqueous polyurethane dispersion that includes polyurethane-acrylate particles dispersed in an aqueous medium. The particles include the reaction product obtained by polymerizing the components of a pre-emulsion formed from:

(A) an active hydrogen-containing polyurethane acrylate prepolymer, comprising a reaction product obtained by reacting:
   (i) a polyol;
   (ii) a polymerizable, ethylenically unsaturated monomer containing at least one hydroxyl group;
   (iii) a compound comprising a $C_1$–$C_{30}$ alkyl group having at least two active hydrogen groups selected from carboxylic acid groups and hydroxyl groups, wherein at least one active hydrogen group is a hydroxyl group; and
   (iv) a polyisocyanate;
(B) one or more hydrophobic polymerizable ethylenically unsaturated monomers; and
(C) a crosslinking monomer.

The active hydrogen functional polyurethane acrylate prepolymer of (A) includes at least 30 percent by weight of polyurethane acrylate prepolymer that includes one or more prepolymers having at least one terminal polymerizable site of ethylenic unsaturation at one end of the molecule, and at least one active hydrogen-containing group at the opposite end of the molecule; and at least 10 percent by weight of one or more prepolymers having at least one terminal polymerizable site of ethylenic unsaturation at each end of the molecule.

The present invention is also directed to a thermosetting composition that includes:

(I) a first reactant comprising reactive functional groups;
(II) a curing agent having functional groups reactive with the functional groups of the first reactant in (I);
(III) a latex emulsion comprising crosslinked polymeric microparticles dispersed in an aqueous continuous phase, the polymeric microparticles prepared from a monomer mix comprised of:
   (a) at least 20 weight percent of a crosslinking monomer having two or more groups of reactive unsaturation and/or monomers having one or more functional groups capable of reacting to form crosslinks after polymerization;
   (b) at least 2 weight percent of one or more polymerizable ethylenically unsaturated monomers having hydrophilic functional groups having the following structures (I) and/or (II):

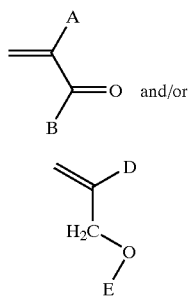

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and (c) optionally, the balance comprised of one or more polymerizable ethylenically unsaturated monomers, wherein (a), (b) and (c) are different from each other; and (IV) The aqueous polyurethane dispersion described above.

The present invention is further directed to a method of coating a substrate that includes applying the above-described thermosetting composition over at least a portion of the substrate; coalescing the thermosetting composition to form a substantially continuous film on the substrate; and curing the thermosetting composition.

The present invention is additionally directed to a multi-layer composite coating that includes a base coat layer deposited from an effect pigment-containing basecoat composition and a substantially pigment-free topcoat layer deposited over at least a portion of said basecoat layer from a substantially pigment free topcoat composition.

The present invention is still further directed to a coated substrate that includes a substrate and the above-described multi-layer composite coating composition over at least a portion of the substrate.

The present invention is also directed to a coating composition that includes a latex emulsion comprising crosslinked polymeric microparticles dispersed in an aqueous continuous phase as described above and the aqueous polyurethane dispersion described above.

Additionally, the present invention is directed to a coating composition that includes the aqueous polyurethane dispersion described above.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "substantially free" is meant to indicate that a material can be present in an incidental amount. In other words, the material is not intentionally added to an indicated composition, but may be present at minor or inconsequential levels, for example, because it was carried over as an impurity as part of an intended composition component.

As used herein, by "thermosetting composition" is meant one which "sets" irreversibly upon curing or crosslinking, wherein the polymer chains of the polymeric components are joined together by covalent bonds. This property is usually associated with a crosslinking reaction of the composition constituents often induced, for example, by heat or radiation. Hawley, Gessner G., *The Condensed Chemical Dictionary*, Ninth Edition., page 856; Surface Coatings, Vol. 2, Oil and Colour Chemists' Association, Australia, TAFE Educational Books (1974). Curing or crosslinking reactions also may be carried out under ambient conditions. Once cured or crosslinked, a thermosetting composition will not melt upon the application of heat and is insoluble in solvents. By contrast, a "thermoplastic composition" comprises polymeric components which are not joined by covalent bonds and thereby can undergo liquid flow upon heating and are soluble in solvents. Saunders, K. J., *Organic Polymer Chemistry*, pp. 41–42, Chapman and Hall, London (1973).

As used herein, the term "polymer" is meant to encompass oligomers, and includes without limitation both homopolymers and copolymers. Also, as used herein, the term "reactive" refers to a functional group that forms a covalent bond with another functional group under conditions sufficient to cure the composition. As used herein, "(meth)acrylate" and like terms is intended to include both acrylates and methacrylates.

As used herein, the term "polyisocyanate", unless otherwise indicated, is intended to include blocked (or capped) isocyanates as well as unblocked (poly)isocyanates.

As used herein, by "substantially pigment-free coating composition" is meant a coating composition which forms a transparent coating, such as a clearcoat in a multi-component composite coating composition. Such compositions are sufficiently free of pigment or particles such that the optical properties of the resultant coatings are not seriously compromised. As used herein, "transparent" means that the cured coating has a BYK Haze index of less than 50 as measured using a BYK/Haze Gloss instrument.

As used herein, the phrase components "are different from each other" refers to components which do not have the same chemical structure as other components in the composition.

As used herein, the term "cure" as used in connection with a composition, e.g., "composition when cured," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking.

The present invention is directed to a latex emulsion that includes crosslinked polymeric microparticles dispersed in an aqueous continuous phase. The polymeric microparticles may be prepared from a monomer mix that includes:

(a) a crosslinking monomer having two or more sites of reactive unsaturation and/or monomers having one or more functional groups capable of reacting to form crosslinks after polymerization;

(b) a polymerizable ethylenically unsaturated monomer having hydrophilic functional groups having the following structures (I) and/or (II):

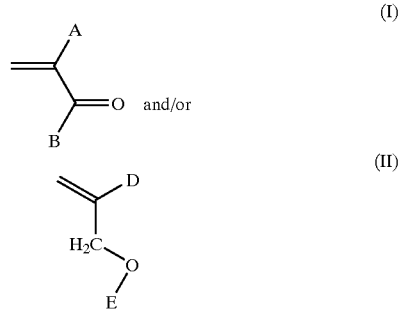

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and, optionally (c) one or more polymerizable ethylenically unsaturated monomers, where (a), (b) and (c) are different from each other.

By "alkylol" is meant a hydrocarbon radical that contains one or more hydroxyl groups. By "alkylamino" is meant a hydrocarbon radical that contains one or more amine groups. As used herein, when referring to the latex emulsion that includes crosslinked polymeric microparticles dispersed in an aqueous continuous phase, a "suitable" material is a material that may be used in or in preparing the latex emulsion that includes crosslinked polymeric microparticles dispersed in an aqueous continuous phase, so long as the material does not substantially affect the stability of the latex emulsion or the polymerization process.

Crosslinking monomers suitable for use as the crosslinking monomer (a) can include any monomer having two or more sites of reactive unsaturation, or any monomer that has one or more functional groups capable of reacting to form crosslinks after polymerization. As used herein, functional groups that are capable of reacting to form crosslinks after polymerization refer to functional groups on a first polymer molecule that may react under appropriate conditions to form covalent bonds with functional groups on a second polymer molecule to form a crosslinked polymer. Functional groups that may react to form crosslinks include, but are not limited to N-alkoxymethyl amides, N-methylolamides, lactones, lactams, mercaptans, hydroxyls, epoxides and the like. Examples of such monomers include, but are not limited to, N-alkoxymethyl(meth)acrylamides, γ-(meth)acryloxytrialkoxysilane, N-methylol(meth)acrylamide, N-butoxymethyl(meth)acrylamide, (meth)acryliclactones, N-substituted (meth)acrylamide lactones, (meth)acryliclactams, and N-substituted (meth)acrylamide lactams and glycidyl (meth)acrylate.

As mentioned above, in one embodiment of the present invention, the crosslinking monomer can have two sites of reactive unsaturation. In a further embodiment, the crosslinking monomer may be one or more of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl) ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylenebis (meth) acrylamide.

The crosslinking monomer (a) comprises at least 15 weight percent, typically at least 20 weight percent, in many cases at least 22.5 weight percent, and in some cases at least 25 weight percent of the monomer mix used to prepare the polymeric microparticles. Also, the crosslinking monomer comprises not more than 45 weight percent, in many cases not more than 40 weight percent, typically not more than 35 weight percent, and in some cases not more than 30 weight percent of the monomer mix used to prepare the polymeric microparticles. The level of the crosslinking monomer (a) used is determined by the desired properties that are to be incorporated into the resulting microparticle. The crosslinking monomer may be present in the monomer mix at any value or in any combination of the recited ranges inclusive of those values stated above.

Any of the polymerizable ethylenically unsaturated monomers having hydrophilic functional groups described by structures I and/or II above may be used as the monomer (b) provided that the monomer can be polymerized in a latex emulsion polymerization system and does not substantially affect the stability of the latex emulsion or the polymerization process.

Polymerizable ethylenically unsaturated monomers having hydrophilic functional groups suitable for use as the monomer (b) in the preparation of the polymeric microparticles of the present invention include, but are not limited to (meth)acrylamide, hydroxyethyl(meth)acrylate, hydroxypropyl(meth)acrylate, dimethylaminoethyl (meth)acrylate, allyl glycerol ether, methallyl glycerol ether and polyethyleneoxide allyl ether.

In an embodiment of the present invention, a particular advantage of the present crosslinked polymeric microparticles is that they do not require the presence of an alkaline material to swell the microparticles, thereby providing desired rheological properties. This eliminates the additional processing step of adding an alkaline material to promote particle swelling and renders the resulting rheological properties more predictable.

In another embodiment of the present invention, the polymerizable ethylenically unsaturated monomers having hydrophilic functional groups (b) include only monomers described by structure (I) above.

In a further embodiment of the present invention, the polymerizable ethylenically unsaturated monomers having hydrophilic functional groups (b) include only monomers described by structure (II) above.

The polymerizable ethylenically unsaturated monomer having hydrophilic functional groups (b) comprises at least 2 weight percent, sometimes greater than 2 weight percent, often at least 5 weight percent, often greater than 5 weight percent, usually at least 7 weight percent, and typically at least 8 weight percent of the monomer mix used to prepare the polymeric microparticles. The polymerizable ethylenically unsaturated monomer having hydrophilic functional groups comprises not more than 35 weight percent, in many cases not more than 30 weight percent, typically not more than 20 weight percent, and often not more than 15 weight percent of the monomer mix used to prepare the polymeric microparticles. The level of the polymerizable ethylenically unsaturated monomer having hydrophilic functional groups used is determined by the properties that are to be incorporated into the resulting microparticle. The level of the polymerizable ethylenically unsaturated monomer having hydrophilic functional groups present in the monomer mix can range between any combination of the recited values inclusive of the recited values.

Polymerizable ethylenically unsaturated monomers suitable for use as the monomer (c) which, optionally, make up the remainder of the monomer mix, and which are different from the crosslinking monomer (a) and the monomer having hydrophilic functional groups (b), may be included in the polymeric microparticles of the present invention. Any suitable polymerizable ethylenically unsaturated monomer may be used, provided that it is capable of being polymerized in a latex emulsion polymerization system and does not substantially affect the stability of the latex emulsion or the polymerization process. Suitable polymerizable ethylenically unsaturated monomers include, but are not limited to, methyl(meth)acrylate, ethyl(meth)acrylate, propyl(meth)acrylate, N-butyl(meth)acrylate, t-butyl(meth)acrylate, 2-ethylhexyl(meth)acrylate, isobornyl (meth)acrylate, dimethylaminoethyl (meth)acrylate, styrene, (meth)acrylonitrile, lauryl (meth)acrylate, cyclohexyl (meth)acrylate, and 3,3,5-trimethylcyclohexyl (meth)acrylate.

The polymerizable ethylenically unsaturated monomer (c) may comprise at least 20 weight percent, typically at least 30 weight percent, in many cases at least 40 weight percent, and in some cases at least 50 weight percent of the monomer mix used to prepare the polymeric microparticles. The polymerizable ethylenically unsaturated monomers may comprise not more than 80 weight percent, in many cases not more than 75 weight percent, typically not more than 70.5 weight percent, and in some cases not more than 67 weight percent of the monomer mix used to prepare the polymeric microparticles. The level of the polymerizable ethylenically unsaturated monomer (c) which can be used is determined by the properties that are to be incorporated into the resulting microparticle. The level of the polymerizable ethylenically unsaturated monomer (c) present in the monomer mix may range between any combination of the recited values inclusive of the recited values.

In a particular embodiment of the present invention, the crosslinking monomer (a) comprises one or more of glycol di(meth)acrylates and glycol tri(meth)acrylates; the polymerizable ethylenically unsaturated monomer having hydrophilic functional groups (b) comprises (meth)acrylamide; and the polymerizable ethylenically unsaturated monomer (c) comprises one or more alkyl(meth)acrylates.

The latex emulsion of crosslinked polymeric microparticles dispersed in an aqueous continuous phase is prepared by latex emulsion polymerization of (a), (b) and optionally, (c) as described above. In many cases, the monomer mixture of (a), (b) and (c) will readily disperse into stable monomer droplets and micelles as would be expected in a Smith-Ewart type of process. In such cases, no monomeric or polymeric emulsifiers and/or protective colloids are added to the latex emulsion, and the latex emulsion is substantially free of polymeric emulsifiers and/or protective colloids. It should be understood, however, that in some cases, a surface active agent may be added to the aqueous continuous phase to stabilize, or prevent coagulation or agglomeration of the monomer droplets, especially during polymerization.

The surface active agent can be present in the latex emulsion of the present invention at any level that stabilizes the emulsion. The surface active agent may be present at least 0.001 percent by weight, often times at least 0.005 percent by weight, typically at least 0.01 percent by weight, and in some cases at least 0.05 percent by weight based on the total weight of the latex emulsion. The surface active agent may be present at up to 10 percent by weight, often times up to 7.5 percent by weight, typically up to 5 percent by weight, and in some cases up to 3 percent by weight based on the total weight of the latex emulsion. The level of the surface active agent used is determined by the amount required to stabilize the latex emulsion. The surface active agent may be present in the latex emulsion at any level or in any range of levels inclusive of those stated above.

The surface active agent may be an anionic, cationic, or nonionic surfactant or dispersing agent, or compatible mixtures thereof, such as a mixture of an anionic and a nonionic surfactant. Suitable cationic dispersion agents include, but are not limited to lauryl pyridinium chloride, cetyldimethyl amine acetate, and alkyldimethylbenzylammonium chloride, in which the alkyl group has from 8 to 18 carbon atoms. Suitable anionic dispersing agents include, but are not limited to alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like. Suitable non-ionic surface active agents include but are not limited to alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers and protective colloids.

A free radical initiator typically is used in the latex emulsion polymerization process. Any suitable free radical initiator may be used. Suitable free radical initiators include, but are not limited to thermal initiators, photoinitiators and oxidation-reduction initiators, all of which may be otherwise categorized as being water-soluble initiators or non-water-soluble initiators. Examples of thermal initiators include, but are not limited to azo compounds, peroxides and persulfates. Suitable persulfates include, but are not limited to sodium persulfate and ammonium persulfate. Oxidation-reduction initiators may include, as non-limiting examples persulfate-sulfite systems as well as systems utilizing thermal initiators in combination with appropriate metal ions such as iron or copper.

Suitable azo compounds include, but are not limited to non-water-soluble azo compounds such as 1-1'-azobiscyclohexanecarbonitrile, 2-2'-azobisisobutyronitrile, 2-2'-azobis(2-methylbutyronitrile), 2-2'-azobis(propionitrile), 2-2'-azobis(2,4-dimethylvaleronitrile), 2-2'-azobis(valeronitrile), 2-(carbamoylazo)-isobutyronitrile and mixtures thereof; and water-soluble azo compounds such as azobis tertiary alkyl compounds include, but are not limited to, 4-4'-azobis(4-cyanovaleric acid), 2-2'-azobis(2-methylpropionamidine) dihydrochloride, 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramide) dihydrochloride and mixtures thereof.

Suitable peroxides include, but are not limited to hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

In one embodiment of the present invention, the average particle size of the polymeric microparticles may be at least 0.001 microns, in many cases at least 0.005 microns, typically at least 0.01 and in some cases at least 0.02 microns. The average particle size of the polymeric microparticles typically is no more than 1 micron, in many cases less than 1 micron, often not more than 0.9 microns and usually not more than 0.8 microns. When the average particle size is too large, the microparticles may tend to settle from the latex emulsion upon storage. The average particle size of the polymeric microparticles may be any value or in any range of values inclusive of those stated above.

In another embodiment of the present invention, the latex emulsion of crosslinked polymeric microparticles dispersed in an aqueous continuous phase is prepared by a seeded latex emulsion polymerization process. Such a seeded latex emulsion polymerization process includes:

(I) providing an overall monomer composition that includes constituent parts of:
(a) at least 20 weight percent of the overall monomer composition including a crosslinking monomer such as any of those described in detail above;
(b) at least 2 weight percent of the overall monomer composition of a polymerizable ethylenically unsaturated monomer having hydrophilic functional groups such as any of those having the structures (I) or (II) described above; and
(c) the balance of the overall monomer composition including one or more polymerizable ethylenically unsaturated monomers such as any of those described in detail above with respect to the polymerizable ethylenically unsaturated monomer (c) in the latex emulsion that includes, crosslinked microparticles, where (a), (b) and (c) are different from each other;

(II) polymerizing a portion of the overall monomer mix, the portion including from 0.1 to 20 weight percent of (a) and from 0.1 to 20 weight percent of (c) to form polymeric seeds dispersed in the continuous phase; and (III) polymerizing the remainder of monomers (a), (b) and (c) in the presence of the dispersed polymeric seeds prepared in step (II) to form a latex emulsion of seeded polymeric microparticles.

While not being limited to a single theory, it is believed that the resulting latex emulsion of seeded polymeric microparticles has improved stability. By "improved stability" is meant improved resistance to settling of the microparticles. In the seeded emulsion polymerization, it is believed that the polymerizable, ethylenically unsaturated monomers having hydrophilic functional groups are incorporated primarily on the surface of the microparticles. This structure adds a considerable electrostatic and/or steric repulsion component to the microparticles, thereby avoiding agglomeration and/or settling of the resulting microparticles. Further, the polymerizable ethylenically unsaturated monomer having hydrophilic functional groups are more likely to agglomerate and form micelles at the hydrophobic seeds formed from a portion of (a) and a portion of (c). Hence, the ethylenically unsaturated monomer(s) having hydrophilic functional groups are less likely to polymerize in the continuous phase forming undesirable grit, coagulum or gel.

A further embodiment of the present invention is directed to a thermosetting composition that includes:

(I) a first reactant comprising reactive functional groups;
(II) a curing agent having functional groups reactive with the functional groups of the first reactant (I); and
(III) the latex emulsion of crosslinked polymeric microparticles dispersed in an aqueous continuous phase as described in detail above. The thermosetting composition may be in any suitable physical form, for example in liquid form, such as a solution, dispersion or emulsions, and in solid form, for example, a dry, particulate powder. In a particular embodiment of the present invention, the thermosetting composition is a coating composition.

In the thermosetting composition of the present invention, the first reactant (I) can include any reactive functional groups. For example, the functional groups can comprise one or more of epoxy, carboxylic acid, hydroxy, amide, oxazoline, aceto acetate, isocyanate, methylol, amino, methylol ether, and carbamate. Likewise, the functional groups of the curing agent (II) can include any reactive functional groups, provided such groups are reactive with those of the first reactant (I). For example, the functional groups of the curing agent (II) can comprise one or more of epoxy, carboxylic acid, hydroxy, isocyanate, capped isocyanate, amine, methylol, methylol ether, and beta-hydroxyalkylamide. Generally, the functional groups of (I) and (II) will be different from and reactive with each other.

Examples of the first reactant (I) which are suitable for use in the thermosetting compositions of the present invention include, but are not limited to, film-forming polymers with at least one reactive functional group. Such polymers can include any of a variety of functional polymers known in the art. For example, suitable hydroxyl group-containing polymers can include acrylic polyols, polyester polyols, polyurethane polyols, polyether polyols, and mixtures thereof. In a particular embodiment of the present invention, the film-forming polymer comprises an acrylic polyol having a hydroxyl equivalent weight ranging from 1000 to 100 grams per solid equivalent, typically 500 to 150 grams per solid equivalent.

Suitable hydroxyl group and/or carboxyl group-containing acrylic polymers can be prepared from polymerizable ethylenically unsaturated monomers and are typically copolymers of (meth)acrylic acid and/or hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene.

In an embodiment of the present invention the acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid; and an epoxy compound which does not participate in the free radical initiated polymerization with the unsaturated acid monomer. Examples of such epoxy compounds include glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The acrylic polymers, that is, those prepared from polymerizable ethylenically unsaturated monomers, can be prepared by solution polymerization techniques, which are well-known to those skilled in the art, in the presence of suitable catalysts such as organic peroxides or azo compounds, as described above. The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Polyester polymers are also useful in the coating compositions of the invention as the film-forming polymer. Useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soy bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, incorporated herein by reference.

Polyurethane polymers containing terminal isocyanate or hydroxyl groups also can be used as the polymer (d) in the coating compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formulas (III) or (IV):

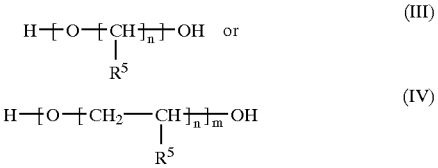

wherein the substituent $R^5$ is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol.

One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. duPont de Nemours and Company, Inc.

Generally, when the first reactant (I) comprises a polymer having reactive functional groups, the polymer will have a weight average molecular weight (Mw) typically ranging from 1,000 to 20,000, typically 1,500 to 15,000 and in many cases 2,000 to 12,000 as determined by gel permeation chromatography using a polystyrene standard.

Polyepoxides such as those described below with reference to the curing agent (II), can also be used as the first reactant (I).

The first reactant (I) may be present in the thermosetting compositions of the present invention in an amount of at least 2 percent by weight, usually at least 5 percent by weight, and typically at least 10 percent by weight based on weight of total resin solids in the coating composition. Also, the first reactant (I) may be present in the thermosetting compositions of the invention in an amount of not more than 80 percent by weight, usually not more than 60 percent by weight, and typically not more than 50 percent by weight based on weight of total resin solids in the thermosetting composition. The amount of the first reactant (I) in the thermosetting compositions of the present invention can range between any combination of these values inclusive of the recited values.

As aforementioned, in addition to the first reactant (I), and the latex emulsion of crosslinked polymeric microparticles (III), the thermosetting composition of the present invention further includes at least one curing agent (II) having functional groups reactive with the functional groups of the first reactant (I).

Dependent upon the reactive functional groups of the first reactant (I), the curing agent (II) can be selected from an aminoplast resin, a polyisocyanate, a blocked isocyanate, a polyepoxide, a polyacid, an anhydride, an amine, a polyol, a carboxylic acid, an hydroxy containing compound, a methylol containing compound, a methylol ether containing compound, a beta-hydroxyalkylamide, and mixtures of any of the foregoing.

In one embodiment, the curing agent (II) includes an aminoplast resin. Aminoplast resins, which may include phenoplasts, as curing agents for hydroxyl, carboxylic acid, and carbamate functional group-containing materials are well known in the art. Aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast resin can contain imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, which in certain instances are monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

In another embodiment of the present invention, the curing agent (II) includes an aminoplast resin which, when added to the other components that form the thermosetting composition, is generally present in an amount ranging from 2 weight percent to 65 weight percent, can be present in an amount ranging from 5 weight percent to 50 weight percent, and typically is present in an amount ranging from 5 weight percent to 40 weight percent based on total weight of resin solids present in the thermosetting composition.

In yet another embodiment of the present invention, the curing agent (II) includes a polyisocyanate curing agent. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked (or capped), any suitable aliphatic, cycloaliphatic, or aromatic alkyl monoalcohol known to those skilled in the art can be used as a blocking agent for the polyisocyanate. Other suitable blocking agents include oximes and lactams. When used, the polyisocyanate curing agent (II) typically is present, when added to the other components which form the thermosetting composition of the present invention, in an amount ranging from 5 to 65 weight percent, can be present in an amount ranging from 10 to 45 weight percent, and often is present in an amount ranging from 15 to 40 percent by weight based on the total weight of resin solids present in the thermosetting composition.

Other useful curing agents can include blocked isocyanate compounds such as, for example, the tricarbamoyl triazine compounds described in detail in U.S. Pat. No. 5,084,541, which is incorporated by reference herein. When used, such blocked isocyante curing agent can be present, when added to the other components in the thermosetting composition, in an amount ranging up to 20 weight percent, and can be present in an amount ranging from 1 to 20 weight percent, based on the total weight of resin solids present in the thermosetting composition.

In one embodiment of the present invention, the curing agent (II) includes both an aminoplast resin and a polyisocyanate.

Anhydrides as curing agents for hydroxyl functional group-containing materials also are well known in the art and can be used in the present invention. Nonlimiting examples of anhydrides suitable for use as curing agents in the compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alpha-methyl styrene, vinyl toluene, and the like. Nonlimiting examples of suitable ethylenically unsaturated carboxylic acid anhydrides include maleic anhydride, citraconic anhydride, and itaconic anhydride. Alternatively, the anhydride can be an anhydride adduct of a diene polymer such as maleinized polybutadiene or a maleinized copolymer of butadiene, for example, a butadiene/styrene copolymer. These and other suitable anhydride curing agents are described in U.S. Pat. No. 4,798,746 at column 10, lines 16–50; and in U.S. Pat. No. 4,732,790 at column 3, lines 41–57, both of which are incorporated herein by reference.

Polyepoxides as curing agents for carboxylic acid functional group-containing materials are well known in the art. Nonlimiting examples of polyepoxides suitable for use in the thermosetting compositions of the present invention comprise polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58, which is incorporated herein by reference.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer which is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Also well known in the art as curing agents for isocyanate functional group-containing materials are polyols, that is, materials having two or more hydroxyl groups per molecule. Nonlimiting examples of such materials suitable for use in the compositions of the invention include polyalkylene ether polyols, including thio ethers; polyester polyols, including polyhydroxy polyesteramides; and hydroxyl-containing polycaprolactones and hydroxy-containing acrylic copolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both of which are incorporated herein by reference.

Polyamines also can be used as curing agents for isocyanate functional group-containing materials. Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-porphylene diamine, 1,8-octane diamine, isophorone diamine, propane-2,2-cyclohexyl amine, and the like. Nonlimiting examples of suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, which is incorporated herein by reference.

When a beta-hydroxyalkylamide curing agent is used, it may be represented by the following structure V:

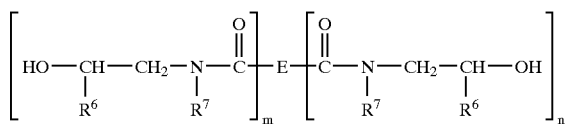

(V)

where $R^6$ is H or $C_1$–$C_5$ alkyl; $R^7$ is H, $C_1$–$C_5$ alkyl structure VI:

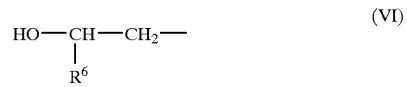

(VI)

for which $R^6$ is as described above, E is a chemical bond or monovalent or polyvalent organic radical derived from saturated, unsaturated, or aromatic hydrocarbon radicals including substituted hydrocarbon radicals containing from 2 to 20 carbon atoms, m is 1 or 2, n is from 0 to 2, and m+n is at least 2.

When desired, appropriate mixtures of curing agents may be used. It should be mentioned that the thermosetting compositions can be formulated as a one-component composition where a curing agent such as an aminoplast resin and/or a blocked isocyanate compound such as those described above is admixed with other composition components. The one-component composition can be storage stable as formulated. Alternatively, the thermosetting composition can be formulated as a two-component composition where a polyisocyanate curing agent such as those described above can be added to a pre-formed admixture of the other composition components just prior to application. The pre-formed admixture can comprise curing agents such as aminoplast resins and/or blocked isocyanate compounds such as those described above.

In a further embodiment, the thermosetting composition comprises a first reactant (I) which includes a polymer containing hydroxyl functional groups, and a curing agent (II) which includes one or more materials selected from polyamines, aminoplast resins and polyisocyanates.

In a particular embodiment of the present invention, the thermosetting composition comprises the following components:

(I) a first reactant comprising reactive functional groups;

(II) a curing agent having at least two functional groups reactive with the functional groups of the first reactant in (a); and (III) the latex emulsion of seeded polymeric microparticles described above.

In another embodiment of the present invention, the thermosetting coating composition is a basecoat composition that may include one or more effect pigments. Nonlimiting examples of suitable effect pigments include, for example, metallic pigments such as aluminum flake and copper bronze flake, and micaceous pigments, for example, metal oxide coated mica. A particular advantage of the thermosetting coating composition of the present invention is improved flake orientation of metallic or micaceous pigments, resulting in improved coating appearance and enhanced Flop Index ratings as described below. The level of effect pigments present in the thermosetting composition of the present invention can vary dependent upon the other composition components, the desired color, and/or the end use of substrate to be coated.

In one embodiment of the present invention where the thermosetting composition comprises one or more effect pigments, the latex emulsion (III) is present in the composition in an amount sufficient to provide a Flop Index rating of 10 or greater, often 11 or greater, and typically 12 or greater.

By "Flop Index rating" as used herein, i.e., in the specification and the claims, is meant the value calculated using the following equation:

$$\text{FLOP INDEX RATING} = \frac{2.69 \times (L15 - L110)^{1.11}}{(L45)^{0.86}}$$

wherein L15 is a measurement of the amount of visible light reflected 15 degrees off specular (visually L15 corresponds to the color of the face angle);

wherein L45 is a measurement of the amount of light reflected 45 degrees off specular (visually L45 corresponds to the color of the flash angle); and wherein L110 is a measurement of the amount of light reflected 110 degrees off specular (visually L110 corresponds to the color for the flop angle).

For purposes of the present invention, Flop Index rating measurements were made using an Xrite MA68-11 flop index instrument available from Xrite Inc., Grandville, Mich. The Flop Index rating ranges from 0 to 100, with 0 being best.

Besides the metallic pigments, the basecoat compositions can contain nonmetallic color and/or filler pigments conventionally used in surface coatings such as, for example, inorganic pigments such as titanium dioxide, iron oxide, chromium oxide, lead chromate, and carbon black; and organic pigments such as phthalocyanine blue and phthalocyanine green.

Optional ingredients in the basecoat composition can comprise those which are well known in the art of formulating surface coatings, and can comprise surface active agents, flow control agents, thixotropic agents, fillers, anti-gassing agents, organic co-solvents, catalysts, and other customary adjuvants. Nonlimiting examples of these materials and suitable amounts are described in U.S. Pat. Nos. 4,220,679; 4,403,003; 4,147,769; and 5,071,904, which patents are incorporated herein by reference.

In a particular embodiment of the thermosetting composition of the present invention, further comprises an aqueous polyurethane dispersion in addition to component (I), (II) and (III). The inclusion of polyurethane dispersions in aqueous coating compositions for improving smoothness, flow and leveling of the coating film is known in the art. Any suitable polyurethane dispersion may be used in the present thermosetting composition. Examples of suitable polyurethane dispersions include, but are not limited to, those disclosed in U.S. Pat. No. 5,071,904 to Martin et al. (col. 4, line 40 to col. 9, line 8); U.S. Pat. No. 6,291,564 to Faler et al. (col. 3, line 32 to col. 4, line 52); U.S. Pat. No. 6,281,272 to Baldy et al. (col. 15, lines 52–66, see Table 1 footnote 9); U.S. Pat. No. 4,880,867 to Gob et al. (col. 7, line 29 to col. 12, line 68); U.S. Pat. No. 5,569,715 to Grandhee (in its entirety); and U.S. Pat. No. 6,025,031 to Lettmann et al. (col. 6, lines 30 to 43) the relevant portions of which are herein incorporated by reference.

The polyurethane dispersion is present in the thermosetting coating composition of the present invention in an amount sufficient to provide a smooth cured coating as measured using a Byk Gardner wave scan instrument.

Generally, the wave scan instrument is a measure of coating surface topography. The wave scan uses a point source (i.e. laser) to illuminate the coating surface over a predetermined distance, for example 10 centimeters, at 60°. The reflected light is measured at the same, but opposite angle. As the light beam hits a "peak" or "valley" of the surface, a maximum signal is detected; when the beam hits a "slope" of a peak/valley a minimum signal is registered. Hence, the measured signal frequency is equal to double spatial frequency of the coating surface topography. That is, the wave scan instrument measures the optical profile of the cured coating surface.

The surface "waveness" is differentiated into longterm and shortterm waveness to simulate visual evaluation by the human eye. Data are divided into longwave (structure size >0.6 mm) and shortwave (structure size <0.6 mm) signals using a mathematical filter function. Longterm waviness represents the variance of the longwave signal amplitude, while the shortterm waviness represents variance of the shortwave signal amplitude. The long- and shortterm waviness of a coating surface can give an indirect measure of topography-influencing factors such as substrate roughness, and flow and leveling properties of coatings. See https://byk-gardnerusa.com/html/Byk/references/Applications/Application 4/application 4.h. For purposes of the present invention, the shortwave values correlate to the surface smoothness of a basecoat in a basecoat/clearcoat system.

A "smooth coating" is one where the cured basecoat/clearcoat system provides shortwave values of no more than 14, usually not more than 12, and typically not more than 10 as measured using the Byk Gardner wave scan instrument as described above.

In a further embodiment of the present invention, the polyurethane dispersion, when employed, is present in an amount of at least 1 percent by weight, in some cases at least 2 percent by weight, in other cases at least 3 percent by weight, some instances at least 5 percent by weight, and in other instances at least 10 percent by weight, based on weight of total resin solids present in the thermosetting composition. Also, when present, the polyurethane dispersion is present in the thermosetting composition in an amount of up to 50 percent by weight, in some cases up to 40 percent by weight, in other cases up to 30 percent by weight, in some instances up to 25 percent by weight and in other instances up to 20 percent by weight based on weight of total resin solids present in the thermosetting composition. The level of polyurethane dispersion present in the thermosetting composition of the present invention can range between any combination of these values inclusive of the recited values.

When the thermosetting composition of the present invention includes a polyurethane dispersion, it may be an aqueous polyurethane dispersion. In an embodiment of the present invention, the aqueous polyurethane dispersion includes polyurethane-acrylate particles dispersed in an aqueous medium. The dispersed particles include the reaction product obtained by polymerizing the components of a pre-emulsion formed from:

(A) an active hydrogen-containing polyurethane acrylate prepolymer, that includes a reaction product obtained by reacting:
  (i) a polyol;
  (ii) a polymerizable ethylenically unsaturated monomer containing at least one hydroxyl group;
  (iii) a compound comprising a $C_1$–$C_{30}$ alkyl group having at least two active hydrogen groups selected from carboxylic acid groups and hydroxyl groups, wherein at least one active hydrogen group is a hydroxyl group; and
  (iv) a polyisocyanate;
(B) a hydrophobic polymerizable ethylenically unsaturated monomers; and
(C) a crosslinking monomer.

The active hydrogen-containing polyurethane acrylate prepolymer (A) in the polyurethane-acrylate particles is present in an amount of at least 20 percent by weight, in some cases at least 25 percent by weight, in other cases at least 30 percent by weight, in some instances at least 35 percent by weight and in other instances at least 40 percent by weight of the solids of the polyurethane-acrylate particles. Further, the active hydrogen-containing polyurethane acrylate prepolymer (A) may be present in an amount of up to 80 percent by weight, in some cases up to 75 percent by weight, in other cases up to 70 percent by weight, in some instances up to 65 percent by weight and in other instances up to 60 percent by weight of the solids of the polyurethane-acrylate particles. The level of active hydrogen-containing polyurethane acrylate prepolymer (A) in the polyurethane-acrylate particles can be any value or range between any combination of these values inclusive of the recited values.

The hydrophobic polymerizable ethylenically unsaturated monomers (B) in the polyurethane-acrylate particles are present in an amount of at least 20 percent by weight, in some cases at least 25 percent by weight, in other cases at least 30 percent by weight, in some instances at least 35 percent by weight and in other instances at least 40 percent by weight of the solids of the polyurethane-acrylate particles. Further, the hydrophobic polymerizable ethylenically unsaturated monomers (B) may be present in an amount of up to 80 percent by weight, in some cases up to 75 percent by weight, in other cases up to 70 percent by weight, in some instances up to 65 percent by weight and in other instances up to 60 percent by weight of the solids of the polyurethane-acrylate particles. The level of hydrophobic polymerizable ethylenically unsaturated monomers (B) in the polyurethane-acrylate particles can be any value or range between any combination of these values inclusive of the recited values.

The crosslinking monomer (C) in the polyurethane-acrylate particles is present in an amount of at least 1 percent by weight, in some cases at least 2 percent by weight, in other cases at least 3 percent by weight, in some instances at least 4 percent by weight and in other instances at least 5 percent by weight of the solids of the polyurethane-acrylate particles. Further, the crosslinking monomer (C) may be present in an amount of up to 20 percent by weight, in some cases up to 17.5 percent by weight, in other cases up to 15 percent by weight, in some instances up to 12.5 percent by weight and in other instances up to 10 percent by weight of the solids of the polyurethane-acrylate particles. The level of crosslinking monomer (C) in the polyurethane-acrylate particles can be any value or range between any combination of these values inclusive of the recited values.

The value of (A)+(B)+(C) will typically be 100%, but will be less than 100% when other components as are known to those skilled in the art are also included in the polyurethane-acrylate particles.

The polyol of (i) may be one or more polyols selected from polyetherpolyols, polyesterpolyols and acrylic polyols. In an embodiment of the present invention, the polyol is one or more polyetherpolyols described by structure VII:

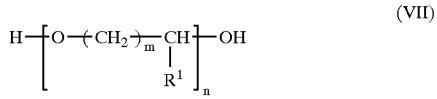

(VII)

where $R^1$ is H or $C_1$–$C_5$ alkyl including mixed substituents for example, n is from 1 to 200 and m is from 1 to 5. Examples of suitable polyetherpolyols that may be used include, but are not limited to, poly(oxytetramethylene) glycols; poly(oxyethylene) glycols; poly(oxy-1,2-propylene) glycols; 1,6-hexanediol; poly(tetrahydrofuran); trimethylolpropane; sorbitol; pentaerythritol; the reaction products of ethylene glycol with a mixture of 1,2-propylene oxide and ethylene oxide; the reaction products obtained by the polymerization of ethylene oxide, propylene oxide and tetrahydrofuran and mixtures of polyols can be used as polyol (i).

In another embodiment of the present invention, the polymerizable ethylenically unsaturated monomer containing at least one hydroxyl group of (ii) may be one or more monomers described by structure VII:

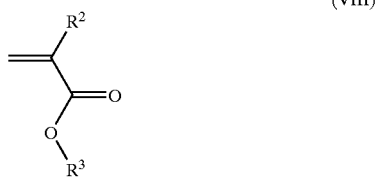

(VIII)

where $R^2$ is H or $C_1$–$C_4$ alkyl and $R^3$ is selected from —$(CHR^4)_p$—$OH_1$—$CH_2CH_2$—(O—$CH_2$—$CHR^4)_p$—OH, —$CH_2$—CHOH—$CH_2$—O—CO—$CR^5R^6R^7$, and —C $H_2$—$CHR^4$—O—$CH_2$—CHOH—$CH_2$—O—CO—$CR^5$ $R^6R^7$ where $R^4$ is H or $C_1$–$C_4$ alkyl, $R^5$, $R^6$, and $R^7$ are H or $C_1$–$C_{20}$ linear or branched alkyl, and p is an integer from 0 to 20. Examples of polymerizable ethylenically unsaturated monomer containing at least one hydroxyl group that may be used in the present invention as component (ii) include, but are not limited to, hydroxyethyl(meth)acrylate, hydroxypropyl(meth)acrylate, hydroxybutyl(meth)acrylate, polyethyleneglycol ester of (meth)acrylic acid, polypropyleneglycol ester of (meth)acrylic acid, the reaction product of (meth)acrylic acid and the glycidyl ester of versatic acid, the reaction product of hydroxyethyl(meth)acrylate and the glycidyl ester of versatic acid, and the reaction product of hydroxypropyl(meth)acrylate and the glycidyl ester of versatic acid. The glycidyl ester of versatic acid is available as Cardura™ Resin E-10 from Resolution Performance Products, Houston, Tex. Mixtures of such hydroxyl group-containing monomers can be used. Nonlimiting suitable examples of the compound of (iii) may include dimethylol proprionic acid and/or 12-hydroxy stearic acid.

The polyisocyanate (iv) may be an aliphatic and/or an aromatic polyisocyanate. Examples of polyisocyanates that may be used as polyisocyanate (iv) include, but are not limited to, isophorone diisocyanate, 4,4'-diphenylmethane diisocyanate, 1,3-phenylene diisocyanate, 1,4-phenylene diisocyanate, tolylene diisocyanate, 1,4-tetramethylene diisocyanate, 1,6-hexamethylene diisocyanate, 1,4-cyclohexyl diisocyanate, alpha, alpha-xylylene diisocyanate, 4,4'-methylene-bis(cyclohexyl isocyanate), 1,2,4-benzene triisocyanate, and polymethylene polyphenyl isocyanate. Mixtures of such polyisocyanates also can be used.

The hydrophobic polymerizable ethylenically unsaturated monomers (B) may be any suitable hydrophobic polymerizable ethylenically unsaturated monomers. As used herein, by "hydrophobic monomer", what is meant is a monomer that is "substantially insoluble" in water. By "substantially insoluble" in water what is meant is that a monomer has a solubility in distilled water of less than 6 g/100 g at 25° C. determined by placing 3 g of water and 0.18 g of monomer in a test tube at 25° C. and shaking the test tube. On visual examination, if two distinct layers form, the monomer is considered to be hydrophobic. If a cloudy solution forms, the turbidity of the mixture is measured using a turbidimeter or nephelometer (for example, Hach Model 2100AN, Hach Company, Loveland, Colo.). A reading of greater than 10 nephelometric turbidity units (NTU) indicates that the monomer is considered to be hydrophobic. Examples of suitable hydrophobic monomers include, but are not limited to, methyl(meth)acrylate, ethyl(meth)acrylate, propyl(meth)acrylate, N-butyl(meth)acrylate, t-butyl(meth)acrylate, 2-ethylhexyl(meth)acrylate, isobornyl (meth)acrylate, glycidyl (meth)acrylate, N-butoxy methyl (meth)acrylamide, styrene, (meth)acrylonitrile, lauryl (meth)acrylate, cyclohexyl (meth)acrylate, and 3,3,5-trimethylcyclohexyl (meth) acrylate. Mixtures of such hydrophobic monomers also can be used.

The crosslinking monomer (C) has two or more sites of polymerizable ethylenic unsaturation. Any suitable crosslinking monomer may be used to prepare the polyurethane-acrylate particles of the present aqueous polyurethane dispersion. For example, suitable crosslinking monomers include, but are not limited to, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra (meth)acrylate, glycerol di(meth)acrylate, glycerol allyloxy di(meth)acrylate, 1,1,1-tris(hydroxymethyl)ethane di(meth) acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylenebis (meth) acrylamide. Mixtures of such crosslinking monomers also can be used.

Not wishing to be limited to a single theory, it is believed that the dispersed polyurethane-acrylate particles contain an ordered macroscopic structure. The ordered structure occurs, in part, because of the compositional balance and resulting hydrophobic-hydrophilic balance as well as the molecular weight of the active hydrogen-containing polyurethane acrylate prepolymer. These balances are controlled by the relative molar ratios of the polyol (i); the polymerizable ethylenically unsaturated monomer containing at least one hydroxyl group (ii); the compound having at least two active hydrogen groups (iii); and the polyisocyanate (iv) in the active hydrogen-containing polyurethane acrylate prepolymer.

As those skilled in the art of polymer science can appreciate, the incorporation of the various components of the active hydrogen-containing polyurethane acrylate prepolymer can occur in a statistically predictable manner. In preparing the present active hydrogen-containing polyurethane acrylate prepolymer, an excess of hydroxyl functionality from compounds (i), (ii) and (iii) is present relative to isocyanate functionality from the polyisocyanate of (iv). This results in the formation of polymer molecules having end groups having hydroxyl functionality from (i) or (iii), and/or an end group containing a polymerizable ethylenically unsaturated group from (ii). The distribution and amount of the carboxylic group of the compound of (iii) on the resulting polyurethane acrylate prepolymer determines the hydrophobic-hydrophilic balance of the prepolymer.

A statistical distribution of three types of prepolymer molecules can result from the preparation of the polyurethane acrylate prepolymer. One type of prepolymer that can be formed is a first surfactant-like prepolymer, which has a hydroxyl and/or carboxylic functional group at one end of the prepolymer and a polymerizable ethylenically unsaturated group at the opposite end of the prepolymer. Additionally, a second surfactant-like prepolymer can result, which has a hydroxyl and/or carboxylic functional group at both ends of the prepolymer. Another type of prepolymer that can result is a hydrophobic prepolymer that does not contain any carboxylic acid groups, which has polymerizable ethylenically unsaturated groups at both ends of the prepolymer molecule.

It is believed that the first and second surfactant-like prepolymers and the hydrophobic prepolymer each provide unique structural features to the polyurethane-acrylate particles of the present aqueous polyurethane dispersion.

It should be understood that for the purposes of the present invention, the reaction product (A) is considered to be a mixture of the aforementioned three types of prepolymers as well as any unreacted portions of components (i), (ii), (iii) and (iv) and any reaction by-products.

During the preparation of the aqueous polyurethane dispersion, the hydrophobic polymerizable ethylenically unsaturated monomers (B) and the crosslinking monomer (C) are added to the active hydrogen-containing polyurethane acrylate prepolymer (A) and passed through a high shear fluid processor for deagglomeration and dispersion of uniform submicron particles, resulting in a stable emulsion or dispersion. Suitable processors include, but are not limited to those sold under the trade name Microfluidizer®, available from the Microfluidics™ division of MFIC Corporation, Newton, Mass. The submicron particles that are formed contain the monomers (B) and (C) and the various prepolymers (A) as described above.

While not being bound to any single theory, it is believed that the hydrophobic prepolymer species associates with the monomers (B) and (C) acting like a sponge to hold the monomers and prevent leakage of the monomers from the submicron particles. The first surfactant-like prepolymer and the second surfactant-like-prepolymer orient with the sponge-like structure formed by the hydrophobic prepolymer such that the ends of the prepolymer molecules having hydroxyl and/or carboxylic acid functional groups orient toward the aqueous continuous phase of the dispersion. It is believed that this orientation of the first and second surfactant-like prepolymers provides electrostatic stabilization to the dispersed particles and helps to prevent agglomeration and/or flocculation of the dispersed particles, thus, minimizing the need for stabilizing surfactants as are commonly used in the prior art. The ability to provide a stable polyurethane dispersion without the inclusion of anionic surfactants as in the prior art allows for improved humidity resistance, adhesion and less yellowing when the thermosetting composition is used as a basecoating composition, especially in multi-layer coating compositions and particularly when the top or clear coat includes a powder coating composition.

Polymerization is conducted using a suitable free radical initiator as defined above. It is believed that on polymerization, the location and orientation of the various prepolymer species and the monomers (B) and (C) are "locked into place." In this way it is believed that the ordered macroscopic structure of the polyurethane-acrylate particles is derived from the compositional ratios and resulting hydrophobic-hydrophilic balance of the various prepolymer species.

Accordingly, the acid-functional polyurethane acrylate prepolymer (A) may include at least 30 percent, in some cases at least 35 percent, in other cases at least 40 percent, in some instances at least 45 percent and in other instances at least 50 percent by weight of the first surfactant-like prepolymer. When the first surfactant-like prepolymer content is too low, it is thought that the dispersed particles may not be sufficiently stabilized to prevent agglomeration or flocculation. The acid-functional polyurethane acrylate prepolymer (A) may include up to 80 percent, in some cases up to 75 percent, in other cases up to 70 percent, in some instances up to 65 percent and in other instances up to 60 percent by weight of the first surfactant-like prepolymer. When the first surfactant-like prepolymer content is too high, it is thought that there may not be enough hydrophobic prepolymer present to prevent monomer leakage from the particles as in Oswald ripening. The first surfactant-like prepolymer may be present in the acid-functional polyurethane acrylate prepolymer (A) at any value or range between the recited values inclusive of those stated above.

The acid-functional polyurethane acrylate prepolymer (A) may include at least 1 percent, in some cases at least 5 percent, in other cases at least 10 percent, in some instances at least 15 percent and in other instances at least 20 percent by weight of the second surfactant-like prepolymer. When the second surfactant-like prepolymer content is too low, it is thought that the dispersed particles may not be sufficiently stabilized to prevent agglomeration or flocculation. The acid-functional polyurethane acrylate prepolymer (A) may include up to 40 percent, in some cases up to 37 percent, in other cases up to 35 percent, in some instances up to 33 percent and in other instances up to 30 percent by weight of the second surfactant-like prepolymer. When the first surfactant-like prepolymer content is too high, it is thought that there may not be enough hydrophobic prepolymer present to prevent monomer leakage and Oswald ripening. The second surfactant-like prepolymer may be present in the acid-functional polyurethane acrylate prepolymer (A) at any value or range between any of the recited values inclusive of those stated above.

The acid-functional polyurethane acrylate prepolymer (A) may include at least 10 percent, in some cases at least 12.5 percent, in other cases at least 15 percent, in some instances at least 17.5 percent and in other instances at least 20 percent by weight of the hydrophobic prepolymer as described above. When the hydrophobic prepolymer content is too low, it is thought that monomer leakage and/or Oswald ripening may not be adequately prevented. The acid-functional polyurethane acrylate prepolymer (A) may include up to 50 percent, in some cases up to 45 percent, in other cases up to 40 percent, in some instances up to 37.5 percent and in other instances up to 35 percent by weight of the hydrophobic prepolymer. When the hydrophobic prepolymer content is too high, it is thought that it may become difficult to stabilize the dispersed particles. The hydrophobic prepolymer may be present in the acid-functional polyurethane acrylate prepolymer (A) at any value or range between any of the values, inclusive of those stated above.

The molecular weight of the active hydrogen-containing polyurethane acrylate prepolymer can be measured by gel permeation chromatography (GPC) using polystyrene standards. However, because of the structural and chemical differences between the active hydrogen-containing polyurethane acrylate prepolymer and the polystyrene standard used to calibrate the GPC instrument, the values for the molecular weight of the active hydrogen-containing polyurethane acrylate prepolymer is an estimate, and it should be understood that the actual values can be smaller. When the GPC methods described above are used to determine the weight average molecular weight of the active hydrogen-containing polyurethane acrylate prepolymer, the molecular weight is at least 2,000, in some cases at least 2,100, in other cases at least 2,200, in some instances at least 2,250 and in other instances at least 2,500. When the molecular weight is too low, it is thought that the hydrophobic prepolymer species may not be able to prevent monomer migration and/or Oswald ripening. The molecular weight, as measured by GPC of the active hydrogen-containing polyurethane acrylate prepolymer may be up to 10,000, in some cases up to 9,000, in other cases up to 7,500, in some instances up to 6,000 and in other instances up to 5,000. When the molecular weight is too high, it is thought that the surfactant species of the active hydrogen-containing polyurethane acrylate prepolymer may not be able to adequately stabilize the dispersed particles. The molecular weight of the active hydrogen-containing polyurethane acrylate prepolymer may be any value or range between any of the recited values, inclusive of those stated above.

In a presently preferred embodiment of the invention, the ordered macroscopic structure of the polyurethane-acrylate dispersed particles is arranged such that greater than 50 percent by weight of an outer portion of the dispersed particle near the aqueous medium includes residues from the first surfactant prepolymer and an interior portion of the dispersed particle includes the hydrophobic prepolymer and greater than 50 percent by weight of the reaction product of the one or more hydrophobic polymerizable ethylenically unsaturated monomers (B); and crosslinking monomer (C).

The average particle size of the polyurethane-acrylate particles of the present aqueous polyurethane dispersion may be at least 50 nanometers, in some cases at least 60 nanometers, in other cases at least 75 nanometers, in some instances at least 100 nanometers and in other instances at least 150 nanometers. When the particle size is too small, it is thought that the surface area of the particles may be so large that there will not be enough surfactant-like prepolymer to prevent agglomeration or flocculation of the particles. The average particle size of the polyurethane-acrylate particles of the present aqueous polyurethane dispersion may be up to one micron, in some cases up to 500 nanometers, in other cases up to 400 nanometers, in some instances up to 300 nanometers and in other instances up to 250 nanometers. When the particle size is too large, it is thought that it may become difficult to prevent settling of the particles. The particle size of the polyurethane-acrylate particles may be any value or range between any of the recited values inclusive of those stated above.

When the present latex emulsion including crosslinked polymeric microparticles is used in thermosetting compositions, especially coating compositions, the resulting coating film will often have a rough finish. The polyurethane dispersions of the prior art may be used in conjunction with the latex emulsion of crosslinked polymeric microparticles, however, the resulting coating demonstrates a decrease in brightness as evidenced by a lower Flop index. However, unlike the prior art, when the aqueous polyurethane dispersion described above is used in conjunction with the latex emulsion that includes crosslinked polymeric microparticles described above the excellent brightness, as measured by the Flop index is maintained while the final cured coating has an excellent smooth finish as measured using the Byk Gardner wave scan instrument. This improvement over the prior art is believed to be due to the ordered macroscopic structure of the particles of the present aqueous polyurethane dispersion. While not being limited to a single theory, it is believed that this structure is better able to conform to and fill the rough areas of the coating and present a smooth surface with no loss in brightness.

In a further embodiment, the present invention is directed to a method of coating a substrate. The method includes:

(A) applying the thermosetting coating composition described above over at least a portion of the substrate;

(B) coalescing the thermosetting coating composition to form a substantially continuous film on the substrate; and (C) curing the thermosetting coating composition.

The present invention is still further directed to a substrate coated by the above-described method.

An additional embodiment of the present invention is directed to a method of coating a substrate that includes:

(1) applying the above-described thermosetting coating composition over at least a portion of the substrate;

(2) coalescing the thermosetting coating composition to form a substantially continuous film on the substrate; and (3) curing the thermosetting coating composition, where the thermosetting coating composition includes the latex emulsion of seeded polymeric microparticles described above.

The thermosetting coating composition can be applied to the substrate by any conventional coating technique such as brushing, spraying, dipping, or flowing. Spray techniques and equipment for air spraying, airless spray, and electrostatic spraying in either manual or automatic methods known in the art can be used.

During application of the thermosetting coating composition to the substrate, the film thickness of the coating formed on the substrate can range from 0.1 to 5 mils (2.54 to 127 micrometers). In another embodiment, the film thickness of the coating formed on the substrate can range 0.1 to 1 mils (2.54 to 25.4 micrometers), and can be 0.4 to 0.6 mils (10.2 to 15.2 micrometers). The coated substrate can be heated to a temperature and for a time sufficient to effect cure of the thermosetting composition applied thereto.

In another embodiment of the present invention, the thermosetting composition is cured at ambient conditions.

A further additional embodiment of the present invention is directed to a multi-layer composite coating which comprises:

(A) a base coat layer deposited from an effect pigment-containing film-forming base coat composition, where the base coat composition includes the above-described thermosetting composition; and (B) a substantially pigment free top coat layer deposited over at least a portion of said base coat layer from a substantially pigment free top coat composition. In a particular embodiment, the thermosetting composition includes the latex emulsion of seeded polymeric microparticles described above.

Another embodiment of the present invention is directed to a coated substrate that includes:

(A) a substrate, and (B) the multi-layer composite coating composition described above over at least a portion of the substrate. The substrate can comprise a metallic substrate, an elastomeric substrate and combinations thereof.

After forming a basecoat layer on at least a portion of the substrate from the thermosetting coating composition, the basecoat can be cured or alternatively given a drying step in which solvent is driven out of the basecoat film by heating or an air drying period before application of the clearcoat. Suitable drying conditions may depend on the particular thermosetting coating composition, and on the ambient humidity, but a drying time from 1 to 15 minutes at a temperature of 70° to 200° F. (210 to 93° C.) can be adequate.

The substantially pigment-free (or clear) topcoat composition can be applied to the basecoat layer by any conventional coating technique, including, but not limited to, compressed air spraying, electrostatic spraying, and either manual or automatic methods. The clear topcoat can be applied to a cured or to a dried basecoat before the basecoat has been cured. In the latter instance, the two coatings can then be heated to cure both coating layers simultaneously. Typical curing conditions can range from 50° F. to 475° F. (10° C. to 246° F.) for 1 to 30 minutes. The clear topcoat thickness (dry film thickness) can range from 1 to 6 mils (25 to 150 micrometers).

A second substantially pigment free topcoat coating composition can be applied to the first topcoat to form a "clear-on-clear" topcoat. The first topcoat coating composition can be applied over the basecoat as described above. The second topcoat coating composition which may be the same or different from the first topcoat composition can be applied to a cured or to a dried first topcoat before the basecoat and first topcoat have been cured. The basecoat, the first topcoat and the second topcoat can then be heated to cure the three coatings simultaneously.

In one embodiment of the present invention, the base coating composition used to form the base coat layer, contains metallic or reflective pigments is the color coat in a color-plus-clear coating system. These are the so-called "glamour finishes" whereby a differential light reflection effect, dependent upon the viewing angle, is achieved. This "flip-flop" effect can be attributed to the proper orientation (i.e., alignment parallel to the substrate surface) of the metallic and/or other reflective pigment in the base coat. Appearance properties such as gloss and distinctness of image, and smoothness, for the most part, can be attributed to the unpigmented top coat (i.e., the clearcoat). The base coating composition, which contains metallic and/or other reflective pigments, is formulated to maximize the "flip-flop" effect; and the top coating composition, which is substantially pigment-free, is formulated to maximize appearance properties such as gloss.

The above-described pigmented film-forming compositions are storage stable compositions which provide multi-component composite coating compositions suitable for automotive color-plus-clear applications. The reflective pigment-containing base coats exhibit excellent "flip-flop" effect and excellent humidity resistance and appearance properties.

A particular advantage of the thermosetting coating composition of the present invention, is that when used as a basecoat in a multilayer coating system, the basecoat can resist penetration of the topcoat into the cured base coat (referred to as "soak in" or "strike in"). The thermosetting compositions of the present invention provide a coating system with excellent durability and improved overall appearance properties (for example improved flow, smoothness and brightness).

The thermosetting coating composition, when used as a metallic base coat composition, provides excellent metallic flake orientation as measured by Flop Index and include primarily HAPS compliant solvents. Further, the coatings derived from the present basecoat composition can be used with a wide variety of clearcoat chemistries and are able to maintain good metallic appearance by minimizing soak in or strike in.

As mentioned above, the multilayer composite coatings of the present invention can comprise two or more transparent topcoats applied over the base coat layer. It should be understood that when employed, the second transparent topcoat and the first transparent topcoat coating compositions can be the same or different provided that, when applied wet-on-wet, one topcoat does not substantially interfere with the curing of the other for example by inhibiting solvent/water evaporation from a lower layer. Moreover, the first topcoat, the second topcoat or both can be the thermosetting coating composition of the present invention. Alternatively, only one of the first topcoat and the second topcoat is formed from the curable coating composition of the present invention.

In this instance, the topcoat that does not comprise the thermosetting coating composition of the present invention can include any of the crosslinkable coating compositions comprising at least one thermosettable coating material and at least one curing agent. Suitable waterborne clearcoats for this purpose are disclosed in U.S. Pat. No. 5,098,947 (incorporated by reference herein) and are based on water-soluble acrylic resins. Useful solvent borne clearcoats are disclosed in U.S. Pat. Nos. 5,196,485 and 5,814,410 (incorporated by reference herein) and include polyepoxides and polyacid curing agents. Suitable powder clearcoats for this purpose are described in U.S. Pat. No. 5,663,240 (incorporated by reference herein) and include epoxy functional acrylic copolymers and polycarboxylic acid curing agents.

When the present thermosetting composition is used in a color-plus-clear system utilizing a powder coating composition as a top or clear coat, improved resistance to yellowing has been found as measured by color differences at an angle of 45° using an X-Rite MA-68 available from X-Rite, Incorporated, Grandville, Mich. The affect that an additive has on yellowing is measured by comparing color-plus-clear coated substrates where one color-plus-clear coated substrate utilizes a basecoat composition that includes an additive with a color-plus-clear coated substrate where the basecoat composition does not include the additive. The X-Rite MA-68 instrument measures according to the L*a*b color space theory. The L*a*b* color space theory states that every color can be plotted in a three dimensional space, with the lightness and darkness on the "L" (verticle) axis, the reds and greens on the "a" (left to right) axis and the yellows and blues on the "b" (front to back) axis. For yellowing, measurements are made with particular reference to the b values of the L*a*b* coordinates, since the b axis represents the color ranging from yellow (+) to blue (−). Thus, a measured value in the negative direction (i.e., a shift from yellow to blue on the b axis) for a sample as compared with a measured value for a comparative sample known to be yellow, would represent a less yellow color as observed visually. Such a color shift of over 0.2 represents a significant color difference.

In an embodiment of the present invention, the aqueous polyurethane dispersion is present in a base coat composition in an amount sufficient to provide a multi-layer composite coating having a b value, as measured according to the L*a*b color space theory, which is at least 0.2 less than the b value of a multi-layer composite coating in which the base coat composition does not contain the aqueous polyurethane dispersion.

Typically, after forming the first topcoat over the basecoat, the first topcoat is given a drying step in which solvent is driven out of the film by heating or, alternatively, an air drying period or curing step before application of the second topcoat. Suitable drying conditions will depend on the particular first topcoat composition, and on the ambient humidity if the composition is water-borne, but, in general, a drying time from 1 to 15 minutes at a temperature of 75° F. to 200° F. (21° C. to 93° C.) will be adequate.

It should be mentioned that the thermosetting compositions of the present invention can be advantageously formulated as a "monocoat", that is, a coating which forms essentially one coating layer when applied to a substrate. The monocoat coating composition can be pigmented. Nonlimiting examples of suitable pigments include those mentioned above. When employed as a monocoat, the coating compositions of the present invention can be applied (by any of the conventional application techniques discussed above) in two or more successive coats, and, in certain instances can be applied with only an ambient flash period between coats. The multi-coats when cured can form essentially one coating layer.

In one embodiment of the present invention, the substrate can comprise a metallic substrate. Examples of suitable metallic substrates can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL®, GALVALUME®, and GALVAN® zinc-aluminum alloys coated upon steel, and combinations thereof. Useful non-ferrous metals include aluminum, zinc, magnesium and alloys thereof. Combinations or composites of ferrous and non-ferrous metals can also be used.

In another embodiment of the present invention, the substrate can comprise an elastomeric substrate. Suitable elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM") and thermoplastic polyurethane ("TPU").

Nonlimiting examples of thermoset materials useful as substrates in connection with the present invention include polyesters, epoxides, phenolics, polyurethanes such as reaction injection molded or "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

In an additional embodiment of the present invention, the thermosetting composition described above can be present as a resinous phase dispersed in an aqueous phase. In this form, the thermosetting composition can be used in a method of electrocoating a conductive substrate. In this method of electrocoating a conductive substrate serves as an electrode in an electrical circuit comprising an electrode and a counter electrode, the substrate being immersed in the composition thermosetting. The method includes passing electric current between the cathode and the anode to cause deposition of the electrocoating composition on the substrate as a substantially continuous film. The present invention is also directed to a substrate coated using the above-described method.

When the present thermosetting composition is used in an electrocoating operation, the first reactant having reactive functional groups and/or the curing agent may additional include an ionic or salt group. The ionic group may be cationic or anionic. When the ionic group is cationic, it may be, for example, one or more of amine salts, quaternary ammonium and quaternary sulfonium groups. The cationic salt group may be derived from an epoxy group-containing monomer which after polymerization has been post-reacted with an amine salt or an amine and acid.

The present invention will further be described by reference to the following examples. The following examples are merely illustrative of the invention and are not intended to be limiting. Unless otherwise indicated, all percentages are by weight.

EXAMPLES 1–8

The following Examples 1 through 8 describe the preparation of highly crosslinked aqueous dispersions. Examples 2, 3, 4, 7 and 8 are comparative examples having lower levels of crosslinking monomers and/or hydrophilic monomers. The aqueous dispersions were prepared as described below from the following ingredients. Amounts listed below indicate parts by weight (grams) unless otherwise noted.

|  | Ex. 1 | Ex. 2 | Ex. 3 | Ex. 4 | Ex. 5 | Ex. 6 | Ex. 7 |
|---|---|---|---|---|---|---|---|
| Charge 1 | | | | | | | |
| Deionized water | 991.8 | 592.5 | 592.5 | 592.5 | 596.9 | 596.9 | 596.9 |
| Dioctyl sulfousuccinate[1] | 1.5 | 0.9 | 0.9 | 0.9 | 0.9 | 0.9 | 0.9 |
| Feed A | | | | | | | |
| Methyl methacrylate | 15.6 | 9.3 | 9.3 | 9.3 | 9.3 | 9.3 | 9.3 |
| Butyl acrylate | 8.2 | 4.9 | 4.9 | 4.9 | 4.9 | 4.9 | 4.9 |
| Ethylene glycol Dimethacrylate | 12.0 | 7.2 | 7.2 | 7.2 | 7.2 | 7.2 | 7.2 |
| Feed B | | | | | | | |
| Deionized water | 39.2 | 29.5 | 29.5 | 29.5 | 29.5 | 29.5 | 29.5 |
| 4,4'-Azobis (4-cyanopentanoic acid) | 4.0 | 2.4 | 2.4 | 2.4 | 2.4 | 2.4 | 2.4 |
| Dimethylethanol amine | 3.6 | 2.2 | 2.2 | 2.2 | 2.2 | 2.2 | 2.2 |
| Feed C | | | | | | | |
| Methyl methacrylate | 296.4 | 194.7 | 211.4 | 228.1 | 186.2 | 194.6 | 203.0 |
| Butyl acrylate | 279.9 | 183.7 | 200.4 | 217.0 | 175.1 | 183.5 | 191.9 |

-continued

|  | Ex. 1 | Ex. 2 | Ex. 3 | Ex. 4 | Ex. 5 | Ex. 6 | Ex. 7 |
|---|---|---|---|---|---|---|---|
| Ethylene glycol Dimethacrylate | 222.4 | 100.0 | 66.6 | 33.3 | 133.8 | 133.8 | 133.8 |
| Acrylamide (50% in water) | 155.6 | 93.0 | 93.0 | 93.0 | 67.1 | 33.6 | |
| Deionized water | 668.6 | 419.0 | 419.0 | 419.0 | 419.0 | 419.0 | 419 |
| Ethoxylated nonyl-phenol ammonium sulfate[2] | 8.1 | 4.8 | 4.8 | 4.8 | 4.8 | 4.8 | 4.8 |
| Feed D |  |  |  |  |  |  |  |
| Deionized water | 247.6 | 148.0 | 148.0 | 148.0 | 148.0 | 148.0 | 148.0 |
| 4,4'-Azobis (4-cyanopentanoic acid) | 4.0 | 2.4 | 2.4 | 2.4 | 2.4 | 2.4 | 2.4 |
| Dimethylethanol amine | 3.6 | 2.2 | 2.2 | 2.2 | 2.2 | 2.2 | 2.2 |
| Feed E |  |  |  |  |  |  |  |
| Biocide[3] | 3.3 | 2.0 | 2.0 | 2.0 | 2.0 | 2.0 | 2.0 |
| Deionized water | | 1.5 | 1.5 | 1.5 | 1.5 | 1.5 | 1.5 |
| Physical properties |  |  |  |  |  |  |  |
| Solids[4] (weight %) | 30.0 | 30.0 | 30.0 | 30.0 | 30.0 | 30.0 | 30.0 |
| Particle size[5] (micron) | 0.1 | 0.1 | 0.1 | 0.1 | 0.1 | 0.1 | 0.1 |

[1]Anionic surfactant, available as AOT-75 from Cytec Industries, Inc., West Patterson, NJ.
[2]Anionic surfactant, available as Alipal CO-436 from GAF.
[3]Proxel GXL from Syngenta Corporation, Wilmington, DE.
[4]As measured at 110° C. for 1 hour
[5]As measured using a Horiba LA-900 Laser Scattering Particle Size Distribution Analyzer, available from Horiba Instruments, Irvine, California.

Charge#1 was added to a reactor fitted with thermocouple, agitator, and reflux condenser. The contents of the reactor were heated to a temperature of 83° C. at which time Feed A was added over a 1 minute period, followed by a hold period of 2 minutes. Feed B then was added over a 1 minute period and the contents of the flask were held at a temperature of 83° C. for a period of 10 minutes. Feed C then was added over a 120 minute period. Approximately ten minutes after the start of the Feed C addition, Feed D was added over a 120 minute period. Upon the completion of the addition of Feed D, the reaction mixture was held at a temperature of 83° C. for 60 minutes, followed by cooling of the reaction product to an ambient temperature. At ambient temperature Feed E then was added.

EXAMPLE 8

This example describes the preparation of an aqueous polyurethane dispersion containing polyurethane-acrylate particles dispersed in an aqueous medium of the present invention.

EXAMPLE 8A

Preparation of an active hydrogen-containing polyurethane acrylate prepolymer. A latex containing a hydrophilic polyurethane prepolymer was prepared by adding 313.3 g of N-methyl pyrrolidine, 234.4 g of hydroxyethyl methacrylate, 241.5 g of dimethylol proprionic acid, 2.3 g of 2,6-Di-tert-butyl 4-methyl phenol, 2.3 g of triphenyl phosphite, and 2.3 g of dibutyl tin dilaurate to a four necked round bottom flask fitted with a thermocouple, mechanical stirrer, and condenser and heated to 100° C. in to obtain a homogeneous solution. Then 1200.0 g of polytetrahydrofuran molecular weight 1000 was added. To this mixture at 90 to 100° C., isophorone diisocyanate 666.9 g was added over 90 minutes. The isocyanate container was rinsed with 153.0 g of butyl acrylate. The reaction mixture was stirred at 90° C. until all the isocyanate groups were reacted. Then 1100.0 g of butyl acrylate was added and cooled to ambient temperature. Based on the ratios of monomers used, the theoretical distribution of compositions for this prepolymer is 25% diol (second surfactant-like prepolymer), 25% diacrylate (hydrophobic prepolymer), and 50% monofunctional in hydroxyl and acrylate (second surfactant-like prepolymer).

EXAMPLE 8B

Preparation of an aqueous polyurethane dispersion. An aqueous polyurethane dispersion was prepared as described below from the following ingredients:

| INGREDIENTS | AMOUNT (grams) |
|---|---|
| CHARGE 1 | |
| Distilled Water | 13,320 |
| Igepal CO-897[6] | 171.4 |
| Diisopropanolamine | 360 |
| Polyurethane prepolymer of Example 8B | 8,000 |
| Ethyleneglycol dimethacrylate | 360 |
| Methyl methacrylate | 2,280 |
| Butylacrylate | 2,000 |
| FEED 1 | |
| Distilled water | 480 |
| t-Butylhydroperoxide | 12 |
| FEED 2 | |
| Distilled water | 480 |
| Ferrous ammonium sulfate | 0.24 |
| Sodium metabisulfite | 12 |
| FEED 3 | |
| Distilled water | 48 |
| Proxel GXL[7] | 24 |

[6]Nonionic surfactant, 70% in water, available from RHODIA, Paris, France.
[7]Biocide containing 9.3% 1,2-Benzisothiazolin-3-one as active Ingredient, available from Syngenta Corporation, Wilmington, DE.

Charge 1 was mixed in a stainless steel beaker until homogeneous and the mixture was microfluidized, by passing once through a Microfluidizer® M110T (Microfluidics™ division of MFIC Corporation, Newton, Mass.) at 8000 psi into a stainless steel beaker and rinsed with 600 g of water. The microfluidized mixture was transferred to a round bottom flask fitted with a thermometer, mechanical stirrer, and condenser, sparged with nitrogen gas. Feed 1 was added to the flask and stirred for one minute. Then, Feed 2 was added to the flask over 30 minutes, an exothermic reaction was observed. The polymer was cooled to 30° C. and Feed 3 was added.

EXAMPLE 9

This example describes the preparation of a prior art hydrophobic polyurethane dispersion.

EXAMPLE 9A

Preparation of a hydrophobic polyurethane prepolymer. A latex containing a hydrophobic polyurethane prepolymer was prepared by adding 1,000 g of poly(neopentyl glycol adipate) with a molecular weight (Mw) of 1,000 available as Fomrez 55–112 from Crompton Corporation, Greenwich, Conn., 116 g of hydroxyethyl methacrylate, 1.4 g of butylated hydroxytoluene and 1.4 g of dibutyl tin dilaurate to a four necked round bottom flask fitted with a thermocouple, mechanical stirrer, and condenser and heated to 70–76° C. in to obtain a homogeneous solution. Then 244 g of tetramethyl xylene diisocyanate (TMXDI) was added over a one-hour period. Butyl acrylate (90 g) was added and the mixture held at 70° C. for two hours. An additional 250 g butyl acrylate was added and the mixture cooled to ambient temperature. The mixture was 80% solids with a Gardner-Holdt viscosity of X+, a hydroxyl value of 29 and an acid value of 0.8.

EXAMPLE 9B

Preparation of an aqueous polyurethane dispersion. An aqueous polyurethane dispersion was prepared as described below from the following ingredients for a pre-emulsion:

| INGREDIENTS | AMOUNT (grams) |
|---|---|
| CHARGE 1 | |
| Distilled Water | 1,760 |
| Rhodapex CO-436[9] | 66.6 |
| Polyglycidyl nonylphenol[10] | 59.8 |
| Dodecylbenzenesulfonic acid (70% in isopropanol) | 28.4 |
| Dimethylethanolamine | 7 |
| Ferrous ammonium sulfate (1% in water) | 4 |
| Defoamer[11] | 0.24 |
| Acrylic acid | 50 |
| Polyurethane prepolymer of Example 9A | 1,500 |
| Ethyleneglycol dimethacrylate | 120 |
| Methyl methacrylate | 210 |
| Butylacrylate | 100 |
| N-methylolacrylamide (48% in water) | 41.6 |

[9]Nonionic surfactant available from RHODIA; 70% in water.
[10]adduct of one mole of nonylphenol and 15 moles of glycidol, 70% aqueous solution.
[11]Foamkill 649 available from Rohm and Haas Company, Philadelphia, PA The pre-emulsion was passed once through a Microfluidizer® M110T (Microfluidics™ division of MFIC Corporation, Newton, Mass.) at 8000 psi and transferred to a four neck round bottom flask equipped with an overhead stirrer, condenser, thermometer, and a nitrogen atmosphere. The polymerization was initiated by adding 3.0 g of isoascorbic acid dissolved in 340 g water followed by a one hour addition of 4.2 g of 35% hydrogen peroxide dissolved in 500 g of water. The temperature of the reaction increased from 24° C. to 59° C. The temperature was reduced to 28° C. and 122.9 g of 50% aqueous diisopropanolamine was added followed by 3.8 g of Proxel GXL in 26.0 g of water. The final pH of the latex was 7.5, the nonvolatile content was 42.9%, the Brookfield viscosity was 92 cps (spindle #1, 50 rpm), and the particle size was 260 nanometers as determined by light scattering using a Coulter N4 Submicron Particle Size Analyzer available from Beckman Coulter, Inc., Miami, Fla.

EXAMPLE 10

This example describes the preparation of an aqueous polyurethane dispersion containing polyurethane-acrylate particles dispersed in an aqueous medium of the present invention.

EXAMPLE 10A

Preparation of an active hydrogen-containing polyurethane acrylate prepolymer. A latex containing a hydrophilic polyurethane prepolymer was prepared by adding 783.2 g of N-methyl pyrrolidine, 585.6 g of hydroxyethyl methacrylate, 603.6 g of dimethylol proprionic acid, 5.9 g of butylated hydroxytoluene, 5.9 g of triphenyl phosphite, and 5.9 g of dibutyl tin dilaurate to a four necked round bottom flask fitted with a thermocouple, mechanical stirrer, and condenser and heated to 100° C. in to obtain a homogeneous solution. Then 3,000.0 g of poly(butylene oxide) molecular weight 1,000 was heated to 70° C. and added. To this mixture at 90° C., isophorone diisocyanate 1,667.3 g was added over 90 minutes. The isocyanate container was rinsed with 153.0 g of butyl acrylate. The reaction mixture was stirred at 90° C. for two hours. Then 2,979 g of butyl acrylate was added and the mixture cooled to ambient temperature. The final product had a non-volatile content of 59.1% (measured at 110° C. for one hour), a Gardner-Holdt viscosity (ASTM D1545-89) of W— and an acid value of 25.6 as measured by potentiometric titration with KOH.

Based on the ratios of monomers used, the theoretical distribution of compositions for this prepolymer is 25% diol (second surfactant-like prepolymer), 25% diacrylate (hydrophobic prepolymer), and 50% monofunctional in hydroxyl and acrylate (second surfactant-like prepolymer).

EXAMPLE 10B

Preparation of an aqueous polyurethane dispersion. An aqueous polyurethane dispersion was prepared as described below from the following ingredients:

| INGREDIENTS | AMOUNT (grams) |
|---|---|
| Pre-emulsion - CHARGE 1 | |
| Distilled Water | 13,320 |
| Igepal CO-897[12] | 171.4 |
| Diisopropanolamine | 360 |
| Polyurethane prepolymer of Example 10A | 8,000 |
| Ethyleneglycol dimethacrylate | 360 |
| Methyl methacrylate | 2,280 |
| Butylacrylate | 2,000 |
| FEED 1 | |
| Distilled water | 480 |
| t-Butylhydroperoxide | 12 |
| FEED 2 | |
| Distilled water | 480 |
| Ferrous ammonium sulfate | 0.24 |
| Sodium metabisulfite | 12 |
| FEED 3 | |
| Distilled water | 48 |
| Proxel GXL[13] | 24 |

[12]Nonionic surfactant available from RHODIA; 70% in water.
[13]Biocide containing 9.3% 1,2-Benzisothiazolin-3-one as active Ingredient, available from Syngenta Corporation, Wilmington, DE.

Charge 1 was mixed in a stainless steel beaker until homogeneous and the mixture was microfluidized, by passing once through a Microfluidizer® M110T at 8000 psi into a stainless steel beaker and rinsed with 600 g of water. The microfluidized mixture was transferred to a stainless steel reactor fitted with a thermometer, mechanical stirrer, and condenser, sparged with nitrogen gas. Feed 1 was added to the reactor and stirred for one minute. Then, Feed 2 was added to the reactor over 30 minutes, an exothermic reaction was observed. The polymer was cooled to 30° C. and Feed 3 was added.

The final pH of the latex was 6.6, the nonvolatile content was 43.2%, (measured at 110° C. for one hour), the Brookfield viscosity was 86 cps (spindle #1, 50 rpm, 25° C.), and the particle size was 96 nanometers.

EXAMPLE 11

This example describes the preparation of an aqueous polyurethane dispersion containing polyurethane-acrylate particles dispersed in an aqueous medium of the present invention.

EXAMPLE 11A

Preparation of a polyester polyol. A polyester was prepared in a four neck round bottom flask equipped with a thermometer, mechanical stirrer, condenser, dry nitrogen sparge, and a heating mantle using the following ingredients:

| INGREDIENTS | AMOUNT (grams) |
| --- | --- |
| Dimer fatty acid[14] | 5,649 |
| cyclohexanedimethanol (CHDM) | 721 |
| dimethylolpropionic acid (DMPA) | 2,011 |
| dibutyltin oxide | 0.84 |
| triphenyl phosphite | 8.4 |

[14]Available as Empol 1008 from Cognis Emery Group, Roermond, Germany

All ingredients were stirred in the flask at 160° C. until 220 ml of distillate was collected and then heated at 130° C. until a total of 267 ml of distillate was collected. The final product was a very viscous pale yellow liquid with a hydroxyl value of 108, an acid value of 82.3, and a nonvolatile content of 98.0% (measured at 110° C. for one hour).

EXAMPLE 11B

Preparation of an active hydrogen-containing polyurethane acrylate prepolymer. The polyurethane was prepared in a four neck round bottom flask equipped with a thermometer, mechanical stirrer, condenser, and a heating mantle. The following ingredients were used:

| INGREDIENTS | AMOUNT (grams) |
| --- | --- |
| polyester of Example 11A | 1,857.6 |
| N-methyl pyrrolidinone | 190.0 |
| hydroxyethyl methacrylate (HEMA) | 208.2 |
| butylated hydroxytoluene | 2.7 |
| dibutyltin dilaurate | 2.7 |
| tetramethyl xylene diisocyanate (TMXDI) | 586.1 |
| butyl acrylate | 949.9 |

The first five ingredients were stirred in the flask at a temperature of 80° C. and the TMXDI was added over a two hour period. 200 g of the butyl acrylate was added and the temperature of the mixture was then held at 80° C. for an additional 3.5 hours. The remainder of the butyl acrylate was added to produce a 60% solution with a Gardner-Holdt viscosity of Z4+ and an acid value of 48.5.

Based on the ratios of monomers used, the theoretical distribution of compositions for this prepolymer is 25% diol (second surfactant-like prepolymer), 25% diacrylate (hydrophobic prepolymer), and 50% monofunctional in hydroxyl and acrylate (second surfactant-like prepolymer).

EXAMPLE 11C

Preparation of an aqueous polyurethane dispersion. A pre-emulsion was prepared by stirring together the following ingredients:

| INGREDIENTS | AMOUNT (grams) |
| --- | --- |
| Water | 1,060 |
| Igepal CO-897 | 14.2 |
| Dimethylethanolamine | 22 |
| Polyurethane of Example 11B | 857.1 |
| Ethylene glycol dimethacrylate | 30 |
| Methyl methacrylate | 120 |
| Butyl acrylate | 35.7 |

The pre-emulsion was microfluidized by passing once through a Microfluidizer® M110T at 8000 psi into a stainless steel beaker and transferred to a four neck round bottom flask equipped with an overhead stirrer, condenser, thermometer, and a nitrogen atmosphere. The Microfluidizer was rinsed with 100 g of water that was added to the flask. The polymerization was initiated by adding 1.0 g of sodium metabisulfite and 0.02 g of ferrous ammonium sulfate dissolved in 40 g of water followed by a 30 minute addition of 1.0 g of t-butyl hydroperoxide dissolved in 40 g of water. The temperature of the reaction increased from 30° C. to 60° C. The temperature was reduced to 29° C. 14.9 g of dimethylethanolamine dissolved in 29.8 g of water and 24.0 g of Proxel GXL in 48.0 g of water were added. The final pH of the latex was 7.2, the nonvolatile content was 43.1% (measured at 110° C. for one hour), the Brookfield viscosity was 69 cps (spindle #1, 50 rpm, 25° C.), and the particle size was 111 nanometers.

EXAMPLE 12

This example describes the preparation of an aqueous polyurethane dispersion containing polyurethane-acrylate particles dispersed in an aqueous medium of the present invention.

EXAMPLE 12A

Preparation of an active hydrogen-containing polyurethane acrylate prepolymer. A latex containing a hydrophilic polyurethane prepolymer was prepared by adding 268.4 g of N-methyl pyrrolidine, 234.3 g of hydroxyethyl methacrylate, 241.5 g of dimethylol proprionic acid, 2.4 g of butylated hydroxytoluene, 2.4 g of triphenyl phosphite, and 2.4 g of dibutyl tin dilaurate to a four necked round bottom flask fitted with a thermocouple, mechanical stirrer, and condenser and heated to 100° C. to obtain a homogeneous solution. Then 1,200.0 g of poly(butylene oxide) molecular weight 1,000 was heated to 70° C. and added. To this mixture at 100° C., tetramethyl xylene diisocyanate 732.6 g was added over 3 hours. The isocyanate container was rinsed with 142.0 g of butyl acrylate. The reaction mixture was stirred at 100° C. for five hours. Then 1,200.0 g of butyl acrylate was added and the mixture cooled to ambient temperature. The final product had a non-volatile content of is 59.1% (measured at 110° C. for one hour), a Gardner-Holdt viscosity of W-, and an acid value of 25.2.

Based on the ratios of monomers used, the theoretical distribution of compositions for this prepolymer is 25% diol (second surfactant-like prepolymer), 25% diacrylate (hydrophobic prepolymer), and 50% monofunctional in hydroxyl and acrylate (second surfactant-like prepolymer).

EXAMPLE 12B

Preparation of an aqueous polyurethane dispersion. An aqueous polyurethane dispersion was prepared as described below from the following ingredients:

| INGREDIENTS | AMOUNT (grams) |
|---|---|
| Pre-emulsion - CHARGE 1 | |
| Distilled Water | 1060 |
| Igepal CO-897 | 14.2 |
| Dimethylethanolamine | 22 |
| Polyurethane prepolymer | 666.7 |
| Ethyleneglycol dimethacrylate | 30 |
| Methyl methacrylate | 190 |
| Butylacrylate | 157.7 |
| FEED 1 | |
| Distilled water | 40 |
| Ferrous ammonium sulfate | 0.2 |
| Sodium metabisulfite | 1.0 |
| FEED 2 | |
| Distilled water | 40 |
| t-Butylhydroperoxide | 1.0 |
| FEED 3 | |
| Distilled water | 4.0 |
| Proxel GXL | 2.0 |

Charge1 was mixed in a stainless steel beaker until homogeneous and the mixture was microfluidized, by passing once through a Microfluidizer® M110T at 8000 psi into a stainless steel beaker and rinsed with 600 g of water. The microfluidized mixture was transferred to a round bottom flask fitted with a thermometer, mechanical stirrer, and condenser, sparged with nitrogen gas. Feed 1 was added to the flask and stirred for one minute. Then, Feed 2 was added to the flask over 30 minutes, an exothermic reaction was observed. The polymer was cooled to 30° C. and Feed 3 was added.

The final pH of the latex was 7.1, the nonvolatile content was 43.3%, (measured at 110° C. for one hour), the Brookfield viscosity was 81 cps (spindle #1, 50 rpm, 25° C.), and the particle size was 88 nanometers.

EXAMPLE 13

This example describes the preparation of a polyester polymer used as a component in the aqueous thermosetting compositions of the present invention. The polyester was prepared from the following ingredients as described below.

| INGREDIENTS | PARTS BY WEIGHT (grams) |
|---|---|
| EMPOL 1008[15] | 4206.3 |
| Cyclohexyldimethanol | 1100.5 |
| Dimethanolpropionic acid | 301.5 |
| Trimellitic anhydride | 150.0 |
| Butyl ether of propylene glycol | 2241.7 |

[15]A dimerdiacid available from Cognis Emery Group, Roermond, Germany

The polyester polymer was prepared in a four-neck round bottom flask equipped with a thermometer, mechanical stirrer, condenser, dry nitrogen sparge and a heating mantle.

The first four ingredients were heated to a temperature of 180° C. and stirred in the flask until 257 grams of distillate was collected and the acid value dropped to the range of 22–25. The material was then cooled to a temperature of 130° C. and the butyl ether of propylene glycol was added. The final product was a liquid having Gardner-Holdt viscosity of Z5–Z6, a non-volatile content of 71.1% (as measured at 110° C. for one hour), and weight averaged molecular weight of 23,125 as measured by gel permeation chromatography using polystyrene standards.

EXAMPLES 14 AND 15

The following Example 14 and Comparative Example 15 describe the preparation of an aqueous silver metallic basecoat composition in accordance with the present invention and a basecoat composition comprising a conventional microgel, respectively. For each composition, an aluminum pigment slurry, "Premix A" was prepared as described below. The components were admixed under agitation, and the admixture was allowed to stir for 20 minutes until well dispersed.

Premix A

| COMPONENT | Parts by Weight (grams) |
|---|---|
| Propylene Glycol Monobutyl ether | 7.4 |
| Aluminum Paste[16] | 5.1 |
| Tinuvin 1130 | 1.6 |
| CYMEL ® 303 | 3.7 |
| Aluminum Passivator | 1.6 |

[16]Aluminum pigment paste 7670NS available from Toyal America, Inc.

Aqueous Basecoat Compositions

The following examples describe the preparation of two aqueous basecoat compositions. Example 14 describes the preparation of an aqueous basecoat including the highly crosslinked aqueous dispersion of Example 1 above, and Comparative Example 15 describes the preparation of an aqueous basecoat composition which contains a conventional microgel. The basecoat compositions were prepared as described below from a mixture of the following components.

| COMPONENT | Example 14 | Example 15 (comparative) |
|---|---|---|
| Polyurethane dispersion of Example 8 | 13.1 | 13.1 |
| 50% Aqueous DIPA | 0.7 | 0.7 |
| Dispersion of Example 1 | 18.5 | |
| Polyurethane dispersion[17] | | 25.7 |
| Mineral Spirits | 1.5 | 1.5 |
| Deionized Water | 7.2 | |
| Premix A | 19.4 | 19.4 |
| Polyester of Example 13 | 5.3 | 5.3 |
| Aqueous Thickener Solution[18] | 33.7 | 33.7 |
| 50% Aqueous DIPA | 0.6 | 0.6 |
| Flop Index — BC | 15.8 | 14.1 |
| Flop Index — BC/CC | 14.3 | 11.5 |

[17]From Example 9.
[18]1% solution of LAPONITE RD in deionized water. LAPONITE RD is a synthetic clay available from Southern Clay Products, Inc., Gonzales, Texas.

Each of the basecoat compositions of Examples 14 and 15 was prepared by mixing the respective ingredients under agitation. The pH of each composition was adjusted to 8.4–8.6 using an appropriate amount of 50% aqueous solution of DIPA. The viscosity of each aqueous basecoat composition was reduced to a spray viscosity of 33 to 37 seconds (DIN #4 cup) with deionized water.

Test Panel Preparation

Each aqueous basecoat was applied in a humidity and temperature controlled spray booth at 60% relative humidity ("RH") and 70° F. (21° C.) onto cold rolled steel substrates which had been previously electrocoated with ED5000 and primed with 1177225A gray primer (both products available commercially from PPG Industries, Inc.), the primed panels having been prepared by ACT Laboratories Inc., of Hillsdale Mich. Each aqueous basecoat composition was spray-applied using the SATA LP90 gun with a MSB nozzle and 135 air cap.

Two sets of test panels were prepared as follows. For one set, the aqueous basecoats were applied such that the dry or cured film thickness of each coating was in the range of 0.4 to 0.6 mils (10.2 to 15.2 micrometers) thickness. The basecoated test panels were allowed an ambient air flash period of 3 minutes at 70° F. (21° C.)/60% RH, followed by heating for 3 minutes at 176° F. (80° C.) to further dehydrate the coating. After dehydration, the basecoated panels were fully cured by heating for 30 minutes at a temperature of 275° F. (135° C.) (hereinafter referred to as "basecoat only" or "BC" panels). A second set of test panels was prepared by applying each of the afore-described basecoating compositions, dehydrating the basecoats as described above, and subsequently spray-applying a clearcoat (TKU1050, a two-component isocyanate containing clearcoat available from PPG Industries, Inc.) over the dehydrated basecoats. After each clearcoat application, the coated panels were give a 10 minute ambient temperature air flash-period followed by curing at 275° F. (135° C.) for 30 minutes. The clearcoat was applied such that between 1.4 and 1.6 mils (35.6 to 40.6 micrometers) of dry clearcoat film thickness was achieved. (Hereinafter referred to as "basecoat/clearcoat" or "BC/CC".)

Test Panel Evaluation

The test panels prepared as described above were evaluated for "Flop Index" rating using an Xrite MA68-II flop index instrument available from Xrite Inc, Grandville, Mich. Flop Index is a measure of the change in brightness as a function of viewing angle. The larger the number the greater the color change with angle. A higher Flop Index is more desirable for silver metallic basecoats. Ratings of "Low" and "Very Low" indicate Flop Index values of less than 10 and less than 8, respectively.

The Flop Index results listed above illustrate that the basecoating composition containing the highly crosslinked aqueous dispersions and aqueous polyurethane dispersion of the present invention provide improved aluminum flake orientation as compared with an analogous basecoat composition containing a conventional polyurethane dispersion.

EXAMPLES 16 AND 17

The following Examples describe the preparation of aqueous silver metallic basecoat compositions containing the aqueous dispersions of Examples 11 and 12, respectively. For each of the basecoat compositions of Examples 16 and 17, an aluminum pigment slurry, "Premix B", first was prepared as described below. The Premix B components were admixed under agitation, and the admixture was allowed to stir for 20 minutes until well dispersed.

Premix B

| COMPONENT | PARTS BY WEIGHT (grams) |
|---|---|
| Propylene Glycol Monobutyl ether | 60 |
| Aluminum Paste[19] | 56.3 |
| Tinuvin 1130[20] | 6 |
| CYMEL 303[21] | 40 |
| Aluminum Passivator[22] | 2 |
| 50% aqueous DMEA[23] | 13.8 |
| Poly(propylene glycol), M.W. 425 | 10 |
| Byk 348[23] | 0.4 |
| Surfynol 104E[25] | 8 |
| Octanol | 16 |

[19]Pigment paste of a 4:1 w/w ratio of Sparkle Silver 5271-AR and Sparkle Silver E-1745-AR available from Silberline Manufacturing Company, Tamaqua, PA.
[20]Substituted benzotriazole UV light absorber available from Ciba Additives, Tarrytown, NY.
[21]Fully alkylated HMMM type melamine formaldehyde resin available from Cytec Industries, Inc., West Patterson, NJ.
[22]A 60/36/4 w/w solution of LUBRIZOL 2062/diisopropanolamine/Propylene glycol Butyl ether LUBRIZOL 2062 is available from the Lubrizol Co., Cleveland, OH.
[23]dimethylethanolamine.
[24]Defoamer available from BYK Chemie, Wesel, Germany.
[25]Surfactant available from Air Products and Chemicals, Inc., Allentown, PA Aqueous Basecoat Compositions The aqueous basecoat compositions of Examples 16 and 17 were prepared as described below from the following ingredients. Amounts listed below are in parts by weight (grams) unless otherwise indicated.

| COMPONENT | (grams) Ex 16 | (grams) Ex 17 |
|---|---|---|
| Shell Sol 71[26] | 20 | 20 |
| Dispersion of EXAMPLE 12 | 232.6 | |
| Dispersion of EXAMPLE 11 | | 232.0 |
| Daotan 6462[27] | 138.9 | 138.9 |
| 50% Aqueous DMEA | 6 | 6 |
| Propylene glycol monobutyl ether | 20 | 20 |
| Premix B | 212.4 | 212.4 |
| Deionized Water | 231.6 | 80 |

[26]Mineral Spirits available from Shell Chemical Co., Houston, TX.
[27]Polyurethane dispersion available from Solutia, Inc., St. Louis, MO.

Each of the aqueous basecoat compositions of Examples 16 and 17 was prepared by mixing the above-listed ingredients under agitation. After sitting overnight 68.1 g of water was added to Example 16 and 112.6 g of water was added to EXAMPLE 17. The pH of Example 16 was 8.98 and the viscosity (DIN #4 cup) was 30.0 seconds. The viscosity of Example 17 was 30.0 seconds.

Test Panel Preparation

The coatings of Examples 16 and 17 were compared to Titan Silver aqueous basecoat commercially available from BASF, Mount Olive, N.J. Each aqueous basecoat was applied in a humidity and temperature controlled spray booth at 60% relative humidity ("RH") and 70° F. onto cold rolled steel substrates which had been previously electrocoated with ED5000 and primed with 1177225A gray primer (both products available commercially from PPG Industries, Inc.), the primed panels having been prepared by ACT Laboratories Inc., of Hillsdale Mich. Each aqueous basecoat composition was spray-applied using the SATA LP90 gun with a MSB nozzle and 135 air cap.

at intersections and less than 5% of the lattice is affected, a 3 corresponds to from 5 to 15% detachment, a 2 is from 15 to 35% detachment, a 1 is from 35 to 65% detachment, and a 0 is greater than 65% adhesion loss.

|  | EX. 16 PCC9711 | EX. 16 BASF2K | EX. 17 PCC9711 | EX. 17 BASF2K | BASF TS PCC9711 | BASF TS BASF2K |
|---|---|---|---|---|---|---|
| OEM Properties |  |  |  |  |  |  |
| DOI[28] | 90 |  | 90 |  | 89 |  |
| DOI after humidity[29] | 72 |  | 77 |  | 41 |  |
| Adhesion[30] | 5 | 5 | 5 | 5 | 4 | 5 |
| Adhesion after humidity | 4 |  | 1 |  | 0 |  |
| L15[31] | 128 | 123 | 132 | 127 | 116 | 112 |
| L110[32] | 33 | 34 | 34 | 35 | 37 | 38 |
| Low bake repair properties |  |  |  |  |  |  |
| Adhesion[30] | 5 |  | 0 |  | 0 |  |

[28] Distinction of Image (DOI) was measured by Hunter Lab's Dorigon II where higher numbers indicate better performance.
[29] 10 days in 100° F. condensing humidity cabinet.
[30] Crosshatch adhesion test described above.
[31] L15 —see discussion above relative to Flop Index Rating, L15 corresponds to the color of the face angle.
[32] L110 —see discussion above relative to Flop Index Rating, L110 corresponds to the color of the flop angle.

The aqueous basecoats were applied such that the dry or cured film thickness of each coating was in the range of 0.5 to 0.6 mils (12 to 15 micrometers) thickness. Once spray-applied, the basecoated test panels were allowed an ambient air flash period of 3 minutes at 70° F./60% RH, followed by heating for 3 minutes at 176° F. to further dehydrate the coating. Subsequently one of two clearcoats was spray-applied over the dehydrated basecoats, either a two-component isocyanate-containing clearcoat available from BASF (BASF 2K) or a powder clearcoat known as PCC9711 commercially available from PPG Industries, Inc., Pittsburgh, Pa. After each clearcoat application, the coated panels were give a 10 minute ambient temperature air flash-period followed by curing at 285° F. for 30 minutes. The BASF 2K clearcoat was applied such that 1.98 mils (50 micrometers) of dry clearcoat film thickness was achieved. The PCC9711 clearcoat was applied such that 2.48 mils (62 micrometers) of dry clearcoat film thickness was achieved. These are labeled "OEM Panels".

After 24 hours, the untouched OEM panels were recoated with the appropriate basecoat compositions and flashed as described above. The panels were then repair topcoated with a commercially available 2 component isocyanate repair clear (catalyzed with 0.18% of a 5% solution of dibutyltin-dilaurate in 2-ethoxyethyl propionate) from BASF to give a dry film thickness of 1.96 mils (49 micrometers). After a 10 minute ambient flash, the panels were cured for 50 minutes at 92° C. (195° F.). These panels are labeled "Low Bake Repair Panels".

The adhesion results of the Low Bake Repair Panels are shown before and after humidity testing (10 days, 100° F. condensing humidity cabinet) in Table 5. A standard crosshatch adhesion test was performed with a 2 mm multiblade claw 1 hour after bake or removal of panel from humidity cabinet. Black TESA® tape coded 4651 from Beiersdorf AG, Hamburg, Germany was used for the testing. The rating method is as follows. A rating of 5 corresponds 100% adhesion, for a 4 rating small flakes of coating are detached The results listed above illustrate that the basecoating compositions containing the aqueous polyurethane dispersion of the present invention provide improved adhesion and distinction of image compared with an analogous commercially available basecoat composition.

EXAMPLES 18 AND 19

The following Examples 18 and 19 describe the preparation of aqueous silver metallic basecoat compositions containing the aqueous dispersions of Examples 1 and 8. For each of the basecoat compositions, an aluminum pigment slurry, "Premix C", first was prepared as described below. The Premix C components were admixed under agitation, and the admixture was allowed to stir for 20 minutes until well dispersed.

| | Premix C | |
|---|---|---|
| COMPONENT | (grams) Premix A | (grams) Premix B |
| Propylene Glycol Monobutyl ether | 3.5 | 3.3 |
| Aluminum Paste[33] | 5.0 | 4.8 |
| Tinuvin 1130[34] | 0.2 | 0.2 |
| CYMEL ® 303[35] | 3.5 | 3.3 |
| Aluminum Passivator[36] | 1.5 | 1.4 |
| DIPA[37] | 0.3 | 0.3 |

[33] Pigment paste of a 4:1 w/w ratio of Sparkle Silver 5271-AR and Sparkle Silver E-1745-AR available from Silberline Manufacturing Company.
[34] Substituted benzotriazole UV light absorber available from Ciba Additives.
[35] Fully alkylated HMMM type melamine formaldehyde resin available from Cytec Industries, Inc.
[36] A 60/36/4 w/w solution of LUBRIZOL 2062/diisopropanolamine/Propylene glycol Butyl ether LUBRIZOL 2062 is available from the Lubrizol Co., Cleveland, OH.
[37] Diisopropanolamine.

Aqueous Basecoat Compositions

The aqueous basecoat compositions of Examples 18 and 19 were prepared as described below from the following ingredients. Amounts listed below are in parts by weight (grams) unless otherwise indicated.

| COMPONENT | (grams) Ex 18 | (grams) Ex 19 |
|---|---|---|
| DDBSA/DIPA Solution[38] | 0.2 | 0.2 |
| Polyurethane dispersion[39] | 12.6 | 4.0 |
| 50% Aqueous DIPA | 0.3 | 0.3 |
| Dispersion of Example 1 | 16.8 | 16.1 |
| Dispersion of Example 8 | | 7.8 |
| Mineral Spirits[40] | 1.4 | 1.4 |
| Propylene glycol monobutyl ether | 3.5 | 3.3 |
| Premix A | 14.0 | |
| Premix B | | 13.3 |
| Polyester of Example 13 | 5.0 | 4.8 |
| Laponite Solution[41] | 8.7 | 8.3 |
| Acrysol ASE-60 | 1.9 | 1.8 |
| Deionized Water | 34.5 | 37.4 |
| 50% Aqueous DIPA | 1.1 | 1.3 |

[38]Aqueous solution containing 40% w/w dodecylbenzene sulfonic acid, neutralized with diisopropanolamine ("DIPA").
[39]From Example 9
[40]Mineral Spirits available from Shell Chemical Co., Houston, TX.
[41]A 2% (w/w) aqueous solution of Laponite RD, available from Southern Clay Products, Gonzales, Texas.
[42]Acrylic thickener available from Rohm and Haas, Philadelphia, PA.

Each of the aqueous basecoat compositions of Examples 18 and 19 were prepared by mixing the above-listed ingredients under agitation. The pH of each composition was adjusted to 8.4–8.6 using an appropriate amount of a 50% aqueous solution of DIPA. The viscosity of each of the aqueous basecoat compositions then was reduced to 33 to 37 seconds spray viscosity (DIN #4 cup) using deionized water.

Test Panel Preparation

Each aqueous basecoat was applied in a humidity and temperature controlled spray booth at 60% relative humidity ("RH") and 70° F. (21° C.) onto cold rolled steel substrates which had been previously electrocoated with ED5000 and primed with 1177225A gray primer (both products available commercially from PPG Industries, Inc.), the primed panels having been prepared by ACT Laboratories Inc., of Hillsdale Mich. Each aqueous basecoat composition was spray-applied using the SATA LP90 gun with a MSB nozzle and 135 air cap.

Two sets of test panels were prepared as follows. For one set, the aqueous basecoats were applied such that the dry or cured film thickness of each coating was in the range of 0.4 to 0.6 mils (10.2 to 15.2 micrometers) thickness. The basecoated test panels were allowed an ambient air flash period of 3 minutes at 70° F. (21° C.)/60% RH, followed by heating for 3 minutes at 176° F. (80° C.) to further dehydrate the coating. After dehydration, a clearcoat was spray-applied on top of the basecoat. On one set of panels the clearcoat used was TKU1050 (a two-component isocyanate containing clearcoat available from PPG Industries, Inc.) while HiTech Clearcoat (a medium solids acrylic melamine clearcoat available from PPG Industries, Inc.) was used on the other set. After each clearcoat application, the coated panels were give a 10 minute ambient temperature air flash-period followed by curing at 285° F. (140° C.) for 30 minutes. The clearcoat was applied such that between 1.4 and 1.6 mils (35.6 to 40.6 micrometers) of dry clearcoat film thickness was achieved. (Hereinafter referred to as "basecoat/clearcoat" or "BC/CC".)

Test Panel Evaluation

The test panels prepared as described above were evaluated for "Flop Index" rating using an Xrite MA68-II flop index instrument available from Xrite Inc, Grandville, Mich. Flop Index is a measure of the change in brightness as a function of viewing angle. The larger the number the greater the color change with angle. A higher Flop Index is more desirable for silver metallic basecoats. Shortwave numbers give an indication of the smoothness of the basecoat underneath the clearcoat. It is measured with the BYK Wavescan instrument available from BYK-Gardner. Higher numbers indicate rougher basecoat films.

TABLE 1

| BASECOAT | Clearcoat | Flop Index | Short Wave | Adhesion[43] after Humidity[44] | DOI[45] after Humidity[44] |
|---|---|---|---|---|---|
| EXAMPLE 18 | TKU1050 | 12.1 | 22 | | |
| EXAMPLE 19 | TKU1050 | 12.7 | 15 | | |
| EXAMPLE 18 | HiTech | 12.9 | | 0 | 58 |
| EXAMPLE 19 | HiTech | 13.6 | | 3 | 77 |

[43]Adhesion done by ASTM D3359. Higher numbers indicate better adhesion.
[44]Humidity test is a water immersion type of test. Coated panels are immersed in 63° C. water for 48 hours and then tested upon removal from the water.
[45]DOI (Distinctness of Image) is measured with a Hunter-Dorigon II meter available from Hunter Associates. Higher numbers indicate better more mirror like appearance.

The Flop Index data presented in Table 1 above illustrates that aqueous metallic basecoat compositions containing the aqueous polyurethane dispersion of the present invention (i.e. the composition of Example 8) provides improved aluminum flake orientation (and thus improved Flop Index results) as compared with prior art hydrophobic polyurethane dispersions. From the Shortwave data, it is clear that improved smoothness is obtained as well. Humidity results (water immersion test) show the improved humidity resistance of this resin, both in terms of adhesion and DOI (Distinctness of Image).

EXAMPLES 20–24

The following Examples 20–24 describe the preparation of aqueous polyurethane dispersions of the present invention and their use as a basecoat portion of a multilayer coating composition where the top or clear coat is a powder coating composition.

EXAMPLE 20

This example describes the preparation of an aqueous polyurethane dispersion containing polyurethane-acrylate particles dispersed in an aqueous medium of the present invention.

EXAMPLE 20A

Preparation of an active hydrogen-containing polyurethane acrylate prepolymer. A latex containing a hydrophilic polyurethane prepolymer was prepared by adding 1841.0 g of N-methyl pyrrolidine, 3200.0 g of poly(butylene oxide) molecular weight 2,000, 416.4 g of hydroxyethyl methacrylate, 858.5 g of dimethylol proprionic acid, 6.4 g of butylated hydroxytoluene, and 6.4 g of dibutyl tin dilaurate to a four necked round bottom flask fitted with a thermocouple, mechanical stirrer, and condenser and heated to 100° C. to obtain a homogeneous solution. Then the mixture was cooled to 80° C. and to this mixture 1953.6 g tetramethyl xylene diisocyanate was added over 2 hours. The reaction mixture was stirred at 80° C. for 16 hours. The final product had a non-volatile content of 77.2% (measured at 110° C. for one hour), a Gardner-Holdt viscosity of Z10+, and an acid value of 40.9. Based on the ratios of monomers used, the theoretical distribution of compositions for this prepolymer is 25% diol (second surfactant-like prepolymer), 25% diacrylate (hydrophobic prepolymer), and 50% monofunctional in hydroxyl and acrylate (second surfactant-like prepolymer).

EXAMPLE 20B

Preparation of an aqueous polyurethane dispersion. An aqueous polyurethane dispersion was prepared as described below from the following ingredients:

| INGREDIENTS | AMOUNT (grams) |
|---|---|
| Pre-emulsion - CHARGE 1 | |
| Distilled Water | 3,072 |
| Igepal CO-897 | 45.7 |
| Dimethylethanolamine | 80 |
| Polyurethane of Example 20A | 1,200 |
| Ethyleneglycol dimethacrylate | 96 |
| Methyl methacrylate | 704 |
| Butylacrylate | 1,440 |
| FEED 1 | |
| Distilled water | 192 |
| Ferrous ammonium sulfate | 0.06 |
| Sodium metabisulfite | 3.84 |
| FEED 2 | |
| Distilled water | 384 |
| t-Butylhydroperoxide | 3.2 |

Charge1 was mixed in a stainless steel beaker until homogeneous and the mixture was microfluidized, by passing once through a Microfluidizer® M110T at 8000 psi into a stainless steel beaker and rinsed with 320 g of water. The microfluidized mixture was transferred to a round bottom flask fitted with a thermometer, mechanical stirrer, and condenser, sparged with nitrogen gas. Feed 1 was added to the flask and stirred for one minute. Then, Feed 2 was added to the flask over 30 minutes, an exothermic reaction was observed.

The final pH of the latex was 7.75, the nonvolatile content was 41.9%, (measured at 110° C. for one hour), the Brookfield viscosity was 132 cps (spindle #1, 50 rpm, 25° C.), and the particle size was 93 nanometers.

EXAMPLE 21

This example describes the preparation of an aqueous polyurethane dispersion containing polyurethane-acrylate particles dispersed in an aqueous medium of the present invention. An aqueous polyurethane dispersion was prepared as described below from the following ingredients:

| INGREDIENTS | AMOUNT (grams) |
|---|---|
| Pre-emulsion - CHARGE 1 | |
| Distilled Water | 4,040 |
| Igepal CO-897 EP | 56.8 |
| Dimethylethanolamine | 118.6 |
| Polyurethane of Example 20A | 2,000 |
| Ethyleneglycol dimethacrylate | 120 |
| Methyl methacrylate | 760 |
| Butylacrylate | 1,520 |
| FEED 1 | |
| Distilled water | 480 |
| Ferrous ammonium sulfate | 0.08 |
| Sodium metabisulfite | 2.4 |
| FEED 2 | |
| Distilled water | 240 |
| t-Butylhydroperoxide | 2 |

Charge1 was mixed in a stainless steel beaker until homogeneous and the mixture was microfluidized , by passing once through a Microfluidizer® M110T at 8000 psi into a stainless steel beaker and rinsed with 200 g of water. The microfluidized mixture was transferred to a round bottom flask fitted with a thermometer, mechanical stirrer, and condenser, sparged with nitrogen gas. Feed 1 was added to the flask and stirred for one minute. Then, Feed 2 was added to the flask over 30 minutes, an exothermic reaction was observed.

The final pH of the latex was 7.02, the nonvolatile content was 41.7%, (measured at 110° C. for one hour), the Brookfield viscosity was 346 cps (spindle #1, 50 rpm, 25° C.), and the particle size was 88 nanometers.

EXAMPLES 22–24

Basecoat compositions identified as Examples 22, 23 and 24 below were prepared using the components and amounts (parts by solution weight) shown, and processed in the following manner. The first four components of Part 1 are added to a mixing vessel under agitation and stirred to achieve homogeneity. The polyester or polyurethane dispersion is then added under agitation. Separately, the mineral spirits and DI water from Part 2 are placed in a second vessel under agitation, with the remaining components added one by one. After stirring for uniformity, Part 1 is then added to Part 2 under moderate agitation.

| Description | Example 22 Comparative | Example 23 | Example 24 |
|---|---|---|---|
| Part 1 | | | |
| Propasol B[46] | 27.65 | 27.65 | 27.65 |
| Dowanol DPM[47] | 7.45 | 7.45 | 7.45 |
| HEQ-9346[48] | 0.97 | 0.97 | 0.97 |
| Resimene 750[49] | 22.51 | 22.51 | 22.51 |
| HP-68-6665[50] | 9.40 | | |
| Polyurethane Dispersion Example 20 | | 111.17 | |
| Polyurethane Dispersion Example 21 | | | 111.97 |
| Part 2 | | | |
| Mineral Spirits[51] | 7.84 | 7.84 | 7.84 |
| Deionized Water | 29.41 | 29.41 | 29.41 |
| Polyester/Acrylic Latex[52] | 91.02 | | |
| Setalux 6802 AQ-24[53] | 42.26 | 42.26 | 42.26 |
| DMEA Solution[54] | 0.98 | 0.98 | 0.98 |

-continued

| Description | Example 22 Comparative | Example 23 | Example 24 |
|---|---|---|---|
| 86T-7[55] | 182.39 | 182.39 | 182.39 |
| Witcobond W-242[56] | 24.66 | 24.66 | 24.66 |
| Total | 446.54 | 457.29 | 458.09 |

[46]Available commercially from Dow Chemical Co. as Dowanol PNB.
[47]Available commercially from Dow Chemical Co., Midland, Michigan.
[48]Prepared according to U.S. Pat. No. 5,071,904, Example 1, Part B, Footnote 1
[49]Available commercially from Solutia, Inc., St. Louis, MO.
[50]Condensation reaction product of 39.2 weight percent isostearic acid, 23.8 weight percent 1,4-cyclohexanedicarboxylic acid, and 37 weight percent of trimethylol propane, at 93% solids content in a 60/40 blend of methyl n-amyl ketone and xylene.
[51]Available commercially from Shell Chemical Co., Houston, TX.
[52]U.S. Pat. No. 6,281,272 Example III.
[53]Available commercially from Akzo Nobel Resins, Arnheim, The Netherlands.
[54]50% aqueous solution of Dimethylethanolamine available from Dow Chemical Co.
[55]White pigment paste available from PPG Industries, Inc.
[56]Available commercially from Crompton Corporation, Greenwich, CT.

Coating System Test Panels

To simulate actual commercial coating systems, test panels were prepared as follows: cold rolled steel panels, pre-coated with ED5000, a gray electrocoat commercially available from PPG Industries, Inc., and fully cured, as available from ACT Laboratories, were coated with a white primer/surfacer commercially available from Akzo Nobel Corporation. The basecoats Comparative Example 22, and Examples 23 and 24 were then spray applied to the panels thus prepared to provide a film thickness of approximately 1 mil (25.4 microns). The basecoats were then dehydrated by a 10 minute bake at 176° F. (80° C.). A powder clearcoat, commercially available from PPG Industries, Inc. as ENVIRACRYL™, was then electrostatically applied to the dehydrated basecoats to provide a film thickness of approximately 2.5 mils (63.5 microns). The color-plus-powder clear test panels were then cured to simulate an overbake scenario by heating for four consecutive 30 minute bakes at a temperature of 293° F. (145° C.).

The extent of yellowing of each system was measured using an X-Rite MA-68 available from X-Rite, Incorporated, Grandville, Mich. at an angle of 45°, with particular reference to the b values of the L*a*b* opponents color theory coordinates. The b axis represents the color ranging from yellow (+) to blue (−). Thus, a measured value in the negative direction (i.e., a shift from yellow to blue on the b axis) for a sample as compared with a measured value for a comparative sample known to be yellow, would represent a less yellow color as observed visually. Such a color shift of over 0.2 represents a significant color difference.

The measured "b" axis value at 450 for the color-plus-powder clearcoat system using the basecoat of Comparative Example 22 which contains no polyurethane dispersion was 3.27. The measured "b" axis value at 45° for the color-plus-powder clearcoat systems using the basecoats of Examples 23 and 24 (which each contain a polyurethane dispersion in accordance with the present invention) were 2.59 and 2.62 (average of two runs), respectively. Note these values are in the negative (or blue) direction from that of the comparative system.

The values reported in the table below reflect the absolute value of the difference in the color measurement of the color-plus-powder clear system comprising the basecoat of Comparative Example 22 (which contains no polyurethane dispersion) and the color-plus-powder clear systems comprising the basecoats of Examples 23 and 24, respectively, which contain the polyurethane dispersion. That is, the values reported below reflect the extent of color shift from yellow to blue for each of the systems comprising basecoats prepared in accordance with the present invention.

| Basecoat | Example 23 | Example 24 |
|---|---|---|
| Extent of color shift to blue | 0.68 | 0.65 |

The data presented in the table above illustrate that the inclusion in the basecoating composition of a polyurethane dispersion in accordance with the present invention provides a color-plus-powder clear system having a significant improvement (i.e., a reduction well in excess of 0.2) in yellowness upon overbaking over an analogous color-plus-powder clear system wherein the basecoat contains no polyurethane.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention.

We claim:

1. A thermosetting composition comprising:
   (I) a first reactant comprising reactive functional groups;
   (II) a curing agent having functional groups reactive with the functional groups of the first reactant in (I);
   (III) a latex emulsion comprising crosslinked polymeric microparticles dispersed in an aqueous continuous phase, the polymeric microparticles prepared from a monomer mix comprised of:
   (a) at least 20 weight percent of a crosslinking monomer having two or more groups of reactive unsaturation and/or monomers having one or more functional groups capable of reacting to form crosslinks after polymerization;
   (b) at least 2 weight percent of one or more polymerizable ethylenically unsaturated monomers having hydrophilic functional groups having the following structures (I) and/or (II):

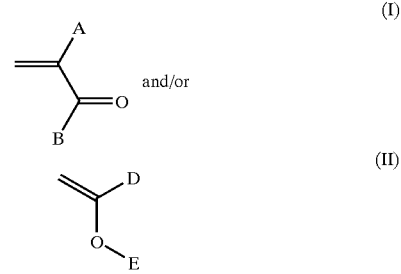

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—($OCH_2CH_2$)$_n$—OH where n is 0 to 30, and, —$CH_2CH_2$—($OC(CH_3)HCH_2$)$_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—($OCH_2CH_2$)$_n$—OH where n is 0 to 30, and —$CH_2CH_2$—($OC(CH_3)HCH_2$)$_m$—OH where m is 0 to 30; and (c) optionally, the balance comprised of one or more polymerizable ethylenically unsaturated monomers, wherein (a), (b) and (c) are different from each other; and (IV) an aqueous polyurethane dispersion, comprising polyurethane-acrylate particles dispersed in an aqueous medium, said particles comprising the reaction product obtained by polymerizing the components of a pre-emulsion formed from:

(A) an active hydrogen-containing polyurethane acrylate prepolymer, comprising a reaction product obtained by reacting:
  (i) a polyol;
  (ii) a polymerizable, ethylenically unsaturated monomer containing at least one hydroxyl group;
  (iii) a compound comprising a $C_1$–$C_{30}$ alkyl group having at least two active hydrogen groups selected from carboxylic acid groups and hydroxyl groups, wherein at least one active hydrogen group is a hydroxyl group; and
  (iv) a polyisocyanate;
(B) one or more hydrophobic polymerizable ethylenically unsaturated monomers; and
(C) a crosslinking monomer;

wherein the active hydrogen functional polyurethane acrylate prepolymer of (A) includes at least 30 percent by weight of polyurethane acrylate prepolymer comprising one or more prepolymers having at least one terminal polymerizable site of ethylenic unsaturation, at one end of the molecule and at least one active hydrogen-containing group at the opposite end of the molecule; and at least 10 percent by weight of the polyurethane acrylate prepolymer comprising one or more prepolymers having at least one terminal polymerizable site of ethylenic unsaturation at each end of the molecule.

2. The thermosetting composition of claim 1, wherein the polyol is one or more polyols selected from the group consisting of polyetherpolyols, polyesterpolyols and acrylic polyols.

3. The thermosetting composition of claim 2, wherein the polyol is one or more polyetherpolyols comprising the following formula (I):

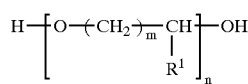

(I)

wherein $R^1$ is H or $C_1$–$C_5$ alkyl including mixed substituents, n is from 1 to 200 and m is from 1 to 5.

4. The thermosetting composition of claim 2, wherein the polyol is one or more polyetherpolyol selected from the group consisting of poly(oxytetramethylene) glycols, poly(oxyethylene) glycols, poly(oxy-1,2-propylene) glycols, the reaction products of ethylene glycol with a mixture of 1,2-propylene oxide and ethylene oxide, poly(tetrahydrofuran), the reaction products obtained by the polymerization of ethylene oxide, propylene oxide and tetrahydrofuran, 1,6-hexanediol, trimethylolpropane, sorbitol and pentaerythritol.

5. The thermosetting composition of claim 1, wherein the polymerizable ethylenically unsaturated monomer containing at least one hydroxyl group is one or more monomers comprising the formula

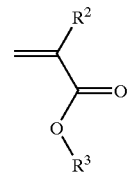

where $R^2$ is H or $C_1$–$C_4$ alkyl and $R^3$ is selected from —(CHR$^4$)$_p$—OH, —$CH_2CH_2$—(O—$CH_2$—CHR$^4$)$_p$—OH, —$CH_2$—CHOH—$CH_2$—O—CO—CR$^5R^6R^7$, and —$CH_2$—CHR$^4$—O—$CH_2$—CHOH—$CH_2$—O—CO—CR$^5R^6R^7$ where $R^4$ is H or $C_1$–$C_4$ alkyl, $R^5$, $R^6$, and $R^7$ are H or $C_1$–$C_{20}$ linear or branched alkyl and p is an integer from 0 to 20.

6. The thermosetting composition of claim 1, wherein the polymerizable ethylenically unsaturated monomer containing at least one hydroxyl group (ii) comprises one or more monomers selected from the group consisting of hydroxyethyl(meth)acrylate, hydroxypropyl(meth)acrylate, hydroxybutyl(meth)acrylate, polyethyleneglycol ester of (meth)acrylic acid, polypropyleneglycol ester of (meth) acrylic acid, the reaction product of (meth)acrylic acid and the glycidyl ester of versatic acid, the reaction product of hydroxyethyl(meth)acrylate and the glycidyl ester of versatic acid, and the reaction product of hydroxypropyl(meth) acrylate and the glycidyl ester of versatic acid.

7. The thermosetting composition of claim 1, wherein the compound (iii) comprises a compound selected from the group consisting of dimethylol proprionic acid and 12-hydroxystearic acid 12-hydroxystearic acid.

8. The thermosetting composition of claim 1, wherein the polyisocyanate (iv) comprises one or more of an aliphatic and an aromatic polyisocyanate.

9. The thermosetting composition of claim 1, wherein the polyisocyanate (iv) comprises one or more selected from the group consisting of isophorone diisocyanate, 4,4'-diphenylmethane diisocyanate, 1,3-phenylene diisocyanate, 1,4-phenylene diisocyanate, tolylene diisocyanate, 1,4-tetramethylene diisocyanate, 1,6-hexamethylene diisocyanate, 1,4-cyclohexyl diisocyanate, alpha, alpha-xylylene diisocyanate, 4,4'-methylene-bis(cyclohexyl isocyanate), 1,2,4-benzene triisocyanate, and polymethylene polyphenyl isocyanate.

10. The thermosetting composition of claim 1, wherein the polyurethane-acrylate dispersed particles of the polyurethane dispersion has an ordered structure wherein greater than 50 percent by weight of an outer portion of the dispersed particle near the aqueous medium comprises residues from the active hydrogen functional polyurethane acrylate prepolymer comprising prepolymers with a polymerizable double bond at one end of the prepolymer and an active hydrogen containing group at the other end of the prepolymer and an interior portion of the particle comprises greater than 50 percent by weight of the reaction product of the one or more hydrophobic polymerizable ethylenically unsaturated monomers (B); and crosslinking monomer (C).

11. The thermosetting composition of claim 1, wherein each of the crosslinking monomer (a) and the crosslinking monomer (C) have two or more sites of polymerizable ethylenic unsaturation.

12. The thermosetting composition of claim 1, wherein each of the crosslinking monomer (a) and the crosslinking monomer (C) comprises one or more monomers selected from the group consisting of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylenebis (meth) acrylamide.

13. The thermosetting composition of claim 1, wherein each of the polymerizable ethylenically unsaturated monomer (c) and the one or more hydrophobic polymerizable ethylenically unsaturated monomers (B) comprises one or more monomers selected from the group consisting of methyl(meth)acrylate, ethyl(meth)acrylate, propyl(meth)acrylate, N-butyl(meth)acrylate, t-butyl(meth)acrylate, 2-ethylhexyl(meth)acrylate, isobornyl (meth)acrylate, glycidyl (meth)acrylate, N-butoxy methyl (meth)acrylamide, styrene, (meth)acrylonitrile, lauryl (meth)acrylate, cyclohexyl (meth)acrylate, and 3,3,5-trimethylcyclohexyl (meth) acrylate.

14. The thermosetting composition of claim 1, wherein the ethylenically unsaturated monomer having hydrophilic functional groups (b) comprises one or more monomers selected from the group consisting of (meth)acrylamide, hydroxyethyl (meth)acrylate, hydroxypropyl (meth)acrylate, and dimethylaminoethyl (meth)acrylate.

15. The thermosetting composition of claim 1, wherein the average particle size of the polymeric microparticles of (III) ranges from 0.01 to 1 microns.

16. The thermosetting composition of claim 1, wherein the average particle size of the polyurethane-acrylate particles of (IV) ranges from 50 nm to 500 nanometers.

17. The thermosetting composition of claim 1, wherein said thermosetting composition is a coating composition.

18. The thermosetting composition of claim 1, wherein the thermosetting composition is substantially free of polymeric emulsifiers and/or protective colloids.

19. The thermosetting composition of claim 1, wherein the functional groups of the first reactant (I) are selected from the group consisting of epoxy, carboxylic acid, hydroxy, amide, oxazoline, aceto acetate, isocyanate, methylol, amino, methylol ether, carbamate, and mixtures thereof.

20. The thermosetting composition of claim 1, wherein the functional groups of curing agent (II) are selected from the group consisting of epoxy, carboxylic acid, hydroxy, isocyanate, capped isocyanate, amine, methylol, methylol ether, beta-hydroxyalkylamide, and mixtures thereof.

21. The thermosetting composition of claim 1, wherein the functional groups of crosslinking agent (II) are different from and reactive with those of the first reactant (I).

22. The thermosetting composition of claim 1, wherein the first reactant (I) is a polymer containing hydroxyl functional groups, and the curing agent (II) comprises one or more materials selected from polyamines, aminoplast resins and polyisocyanates.

23. A coated substrate comprising:
(a) a substrate; and
(b) the thermosetting composition of claim 1 over at least a portion of the substrate (a).

24. The coated substrate of claim 23, wherein the thermosetting composition further comprises one or more effect pigments.

25. The coated substrate of claim 24, wherein the thermosetting composition when cured has a Flop Index of at least 10 and shortwave values of no more than 14.

26. A substrate coated by a method comprising:
(A) applying a thermosetting composition over at least a portion of the substrate;
(B) coalescing said thermosetting composition to form a substantially continuous film on the substrate; and
(D) curing the thermosetting composition, wherein the thermosetting composition comprises:
(I) a first reactant comprising reactive functional groups;
(II) a curing agent having functional groups reactive with the functional groups of the first reactant in (I);
(III) a latex emulsion comprising crosslinked polymeric microparticles dispersed in an aqueous continuous phase, the polymeric microparticles prepared from a monomer mix comprised of:
(a) at least 20 weight percent of a crosslinking monomer having two or more sites of reactive unsaturation and/or monomers having one or more functional groups capable of reacting to form crosslinks after polymerization;
(b) at least 2 weight percent of one or more polymerizable ethylenically unsaturated monomers having hydrophilic functional groups; and
(c) optionally, the balance comprised of one or more polymerizable ethylenically unsaturated monomers, wherein (a), (b) and (c) are different from each other; and
(IV) an aqueous polyurethane dispersion, comprising polyurethane-acrylate particles dispersed in an aqueous medium, said particles comprising the reaction product obtained by polymerizing the components of a pre-emulsion formed from:
(A) an active hydrogen-containing functional polyurethane acrylate prepolymer, comprising a reaction product obtained by reacting:
(i) a polyol;
(ii) a polymerizable ethylenically unsaturated monomer containing at least one hydroxyl group;
(iii) a compound comprising a $C_1$–$C_{30}$ alkyl group comprising at least two active hydrogen groups selected from carboxylic acid groups and hydroxyl groups, wherein at least one active hydrogen group is a hydroxyl group; and
(iv) a polyisocyanate;
(B) one or more hydrophobic polymerizable ethylenically unsaturated monomers; and
(C) a crosslinking monomer;
wherein the active hydrogen functional polyurethane acrylate prepolymer of (A) includes at least 30 percent by weight of polyurethane acrylate prepolymer comprising one or more prepolymers having at least one terminal polymerizable site of ethylenic unsaturation, at one end of the molecule and at least one active hydrogen-containing group at the opposite end of the molecule; and at least 10 percent by weight of the polyurethane acrylate prepolymer comprising one or more prepolymers having at least one terminal polymerizable site of ethylenic unsaturation at each end of the molecule.

27. The coated substrate of claim 26, wherein the thermosetting composition further comprises one or more effect pigments.

28. The coated substrate of claim 27, wherein the thermosetting composition when cured has a Flop index of at least 10 and shortwave values of no more than 14.

29. A multi-layer composite coating comprising:
(A) a base coat layer deposited from an effect pigment-containing base coat composition, wherein said base coat composition comprises:
(I) a first reactant comprising reactive functional groups;
(II) a curing agent having functional groups reactive with the functional groups of the first reactant in (I);
(III) a latex emulsion comprising crosslinked polymeric microparticles dispersed in an aqueous continuous phase, the polymeric microparticles prepared from a monomer mix comprised of:
  (a) at least 20 weight percent of a crosslinking monomer having two or more groups of reactive unsaturation and/or monomers having one or more functional groups capable of reacting to form crosslinks after polymerization;
  (b) at least 2 weight percent of one or more polymerizable ethylenically unsaturated monomers having hydrophilic functional groups having the following structures (I) and/or (II):

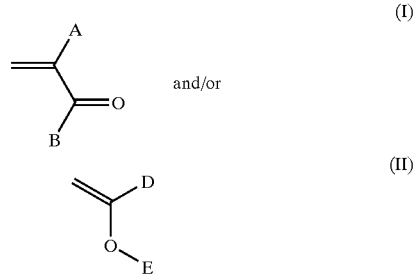

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_m$—OH where n is 0 to 30, and —$CH_2CH_2$—$(OC(CH_3)HCH_2)_n$—OH where m is 0 to 30; and
  (c) optionally, the balance comprised of one or more polymerizable ethylenically unsaturated monomers, wherein (a), (b) and (c) are different from each other; and
(IV) an aqueous polyurethane dispersion, comprising polyurethane-acrylate particles dispersed in an aqueous medium, said particles comprising the reaction product obtained by polymerizing the components of a pre-emulsion formed from:
(A) an active hydrogen-containing polyurethane acrylate prepolymer, comprising a reaction product obtained by reacting:
  (i) a polyol;
  (ii) a polymerizable ethylenically unsaturated monomer containing at least one hydroxyl group;
  (iii) a compound comprising a $C_1$–$C_{30}$ alkyl group comprising at least two active hydrogen groups selected from carboxylic acid groups and hydroxyl groups, wherein at least one active hydrogen group is a hydroxyl group; and
  (iv) a polyisocyanate;
(B) one or more hydrophobic polymerizable ethylenically unsaturated monomers; and
(C) a crosslinking monomer;
wherein the active hydrogen functional polyurethane acrylate prepolymer of (A) includes at least 30 percent by weight of polyurethane acrylate prepolymer comprising one or more prepolymers having at least one terminal polymerizable site of ethylenic unsaturation at one end of the molecule and at least one active hydrogen-containing group at the opposite end of the molecule; and at least 10 percent by weight of the polyurethane acrylate prepolymer comprising one or more prepolymers having at least one terminal polymerizable site of ethylenic unsaturation at each end of the molecule; and
(B) a substantially pigment free top coat layer deposited over at least a portion of said base coat layer from a substantially pigment free top coat composition.

30. The multi-layer composite coating of claim 29, wherein the polyol is one or more polyols selected from the group consisting of polyetherpolyols, polyesterpolyols and acrylic polyols.

31. The multi-layer composite coating of claim 30, wherein the polyol is one or more polyetherpolyols comprising the following formula (I):

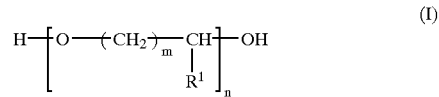

wherein $R^1$ is H or $C_1$–$C_5$ alkyl including mixed substituents, n is from 0 to 200 and m is from 1 to 5.

32. The multi-layer composite coating of claim 29, wherein the polyol is one or more polyetherpolyols selected from the group consisting of poly(oxytetramethylene) glycols, poly(oxyethylene) glycols, poly(oxy-1,2-propylene) glycols, the reaction products of ethylene glycol with a mixture of 1,2-propylene oxide and ethylene oxide, poly (tetrahydrofuran), the reaction products obtained by the polymerization of ethylene oxide, propylene oxide and tetrahydrofuran, 1,6-hexanediol, trimethylolpropane, sorbitol and pentaerythritol.

33. The multi-layer composite coating of claim 29, wherein the polymerizable ethylenically unsaturated monomer containing at least one hydroxyl group is one or more monomers comprising the formula

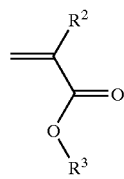

where $R^2$ is H or $C_1$–$C_4$ alkyl and $R^3$ is selected from —$(CHR^4)_p$—OH, —$CH_2CH_2$—(O—$CH_2$—$CHR^4)_p$—OH, —$CH_2$—CHOH—$CH_2$—O—CO—$CR^5R^6R^7$, and —$CH_2$—$CHR^4$—O—$CH_2$—CHOH—$CH_2$—O—CO—$CR^5R^6R^7$ where $R^4$ is H or $C_1$–$C_4$ alkyl, $R^5$, $R^6$, and $R^7$ are H or $C_1$–$C_{20}$ linear or branched alkyl and p is an integer from 0 to 20.

34. The multi-layer composite coating of claim 29, wherein the polymerizable ethylenically unsaturated monomer containing at least one hydroxyl group (ii) comprises one or more monomers selected from the group consisting of hydroxyethyl(meth)acrylate, hydroxypropyl(meth)acrylate, hydroxybutyl(meth)acrylate, polyethyleneglycol ester of (meth)acrylic acid, polypropyleneglycol ester of (meth) acrylic acid, the reaction product of (meth)acrylic acid and the glycidyl ester of versatic acid, the reaction product of hydroxyethyl(meth)acrylate and the glycidyl ester of versatic acid, and the reaction product of hydroxypropyl(meth) acrylate and the glycidyl ester of versatic acid.

35. The multi-layer composite coating of claim 29, wherein the compound (iii) comprises a compound selected from the group consisting of dimethylol proprionic acid and 12-hydroxystearic acid.

36. The multi-layer composite coating of claim 29, wherein the polyisocyanate (iv) comprises one or more of an aliphatic and an aromatic polyisocyanate.

37. The multi-layer composite coating of claim 29, wherein the polyisocyanate (iv) comprises one or more selected from the group consisting of isophorone diisocyanate, 4,4'-diphenylmethane diisocyanate, 1,3-phenylene diisocyanate, 1,4-phenylene diisocyanate, tolylene diisocyanate, 1,4-tetramethylene diisocyanate, 1,6-hexamethylene diisocyanate, 1,4-cyclohexyl diisocyanate, alpha, alpha-xylylene diisocyanate, 4,4'-methylene-bis(cyclohexyl isocyanate), 1,2,4-benzene triisocyanate, and polymethylene polyphenyl isocyanate.

38. The multi-layer composite coating of claim 29, wherein the polyurethane-acrylate dispersed particles of the polyurethane dispersion have an ordered structure wherein greater than 50 percent by weight of an outer portion of the dispersed particle near the aqueous medium comprises residues from the active hydrogen functional polyurethane acrylate prepolymer comprising prepolymers with a polymerizable double bond at one end of the prepolymer and an active hydrogen containing group at the other end of the prepolymer and an interior portion of the particle comprises greater than 50 percent by weight of the reaction product of the one or more hydrophobic polymerizable ethylenically unsaturated monomers (B); and crosslinking monomer (C).

39. The multi-layer composite coating of claim 29, wherein each of the crosslinking monomer (a) and the crosslinking monomer (C) each have two or more sites of polymerizable ethylenic unsaturation.

40. The multi-layer composite coating of claim 29, wherein each of the crosslinking monomer (a) and the crosslinking monomer (C) comprises one or more monomers selected from the group consisting of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylenebis (meth) acrylamide.

41. The multi-layer composite coating of claim 29, wherein each of the polymerizable ethylenically unsaturated monomer (c) and the one or more hydrophobic polymerizable ethylenically unsaturated monomers (B) comprises one or more monomers selected from the group consisting of methyl(meth)acrylate, ethyl(meth)acrylate, propyl(meth)acrylate, N-butyl(meth)acrylate, t-butyl(meth)acrylate, 2-ethylhexyl(meth)acrylate, isobornyl (meth)acrylate, glycidyl (meth)acrylate, N-butoxy methyl (meth)acrylamide, styrene, (meth)acrylonitrile, lauryl (meth)acrylate, cyclohexyl (meth)acrylate, and 3,3,5-trimethylcyclohexyl (meth) acrylate.

42. The multi-layer composite coating of claim 29, wherein the ethylenically unsaturated monomer having hydrophilic functional groups (b) comprises one or more monomers selected from the group consisting of (meth)acrylamide, hydroxyethyl (meth)acrylate, hydroxypropyl (meth)acrylate, and dimethylaminoethyl (meth)acrylate.

43. The multi-layer composite coating of claim 29, wherein the average particle size of the polymeric microparticles of (III) ranges from 0.01 to 1 microns.

44. The multi-layer composite coating of claim 29, wherein the average particle size of the polyurethane-acrylate particles of (IV) ranges from 50 nm to 500 nanometers.

45. The multi-layer composite coating of claim 29, wherein said thermosetting composition is a coating composition.

46. The multi-layer composite coating of claim 29, wherein the thermosetting composition is substantially free of polymeric emulsifiers and/or protective colloids.

47. The multi-layer composite coating of claim 29, wherein the functional groups of the first reactant (I) are selected from the group consisting of epoxy, carboxylic acid, hydroxy, amide, oxazoline, aceto acetate, isocyanate, methylol, amino, methylol ether, carbamate, and mixtures thereof.

48. The multi-layer composite coating of claim 29, wherein the functional groups of curing agent (II) are selected from the group consisting of epoxy, carboxylic acid, hydroxy, isocyanate, capped isocyanate, amine, methylol, methylol ether, beta-hydroxyalkylamide, and mixtures thereof.

49. The multi-layer composite coating of claim 29, wherein the functional groups of crosslinking agent (II) are different from and reactive with those of the first reactant (I).

50. The multi-layer composite coating of claim 29, wherein the first reactant (I) is a polymer containing hydroxyl functional groups, and the curing agent (II) comprises one or more materials selected from polyamines, aminoplast resins and polyisocyanates.

51. A coated substrate comprising:
(A) a substrate, and
(B) the multi-layer composite coating composition of claim 29 over at least a portion of the substrate (A).

52. The coated substrate of claim 51, wherein the thermosetting composition further comprises one or more effect pigments.

53. The coated substrate of claim 51, wherein the substrate is selected from a metallic substrate, an elastomeric substrate, and combinations thereof.

54. The coated substrate of claim 52, wherein the thermosetting composition when cured has a Flop index of at least 10 and shortwave values of no more than 14.

55. A multi-layer composite coating comprising:
(A) a base coat layer deposited from a base coat composition, wherein said base coat composition comprises:
(I) a first reactant comprising reactive functional groups;
(II) a curing agent having functional groups reactive with the functional groups of the first reactant in (I);
(III) a latex emulsion comprising crosslinked polymeric microparticles dispersed in an aqueous continuous phase, the polymeric microparticles prepared from a monomer mix comprised of:
(a) at least 20 weight percent of a crosslinking monomer having two or more groups of reactive unsaturation and/or monomers having one or more functional groups capable of reacting to form crosslinks after polymerization;
(b) at least 2 weight percent of one or more polymerizable ethylenically unsaturated monomers having hydrophilic functional groups having the following structures (I) and/or (II):

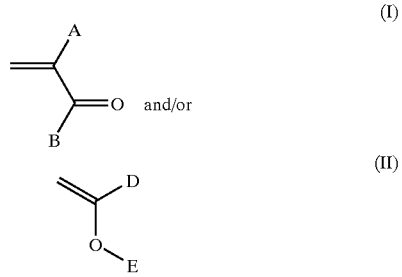

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_m$—OH where n is 0 to 30, and —$CH_2CH_2$—$(OC(CH_3)HCH_2)_n$—OH where m is 0 to 30; and
(c) optionally, the balance comprised of one or more polymerizable ethylenically unsaturated monomers, wherein (a), (b) and (c) are different from each other; and
(IV) an aqueous polyurethane dispersion, comprising polyurethane-acrylate particles dispersed in an aqueous medium, said particles comprising the reaction product obtained by polymerizing the components of a pre-emulsion formed from:
(A) an active hydrogen-containing polyurethane acrylate prepolymer, comprising a reaction product obtained by reacting:
(i) a polyol;
(ii) a polymerizable ethylenically unsaturated monomer containing at least one hydroxyl group;
(iii) a compound comprising a $C_1$–$C_{30}$ alkyl group comprising at least two active hydrogen groups selected from carboxylic acid groups and hydroxyl groups, wherein at least one active hydrogen group is a hydroxyl group; and
(iv) a polyisocyanate;
(B) one or more hydrophobic polymerizable ethylenically unsaturated monomers; and
(C) a crosslinking monomer;
wherein the active hydrogen functional polyurethane acrylate prepolymer of (A) includes at least 30 percent by weight of polyurethane acrylate prepolymer comprising one or more prepolymers having at least one terminal polymerizable site of ethylenic unsaturation at one end of the molecule and at least one active hydrogen-containing group at the opposite end of the molecule; and at least 10 percent by weight of the polyurethane acrylate prepolymer comprising one or more prepolymers having at least one terminal polymerizable site of ethylenic unsaturation at each end of the molecule; and
(B) a substantially pigment free top coat layer wherein said top coat layer comprises a substantially pigment free powder coating composition deposited over at least a portion of said base coat layer from the powder coating composition.

56. The multi-layer composite coating of claim 55, wherein the aqueous polyurethane dispersion (iv) is present in the base coat composition of (A) in an amount sufficient to provide a multi-layer composite coating having a b value, as measured according to the L*a*b color space theory, which is at least 0.2 less than the b value of a multi-layer composite coating in which the base coat composition does not contain the aqueous polyurethane dispersion (iv).

57. A thermosetting composition comprising:
(I) a first reactant comprising reactive functional groups;
(II) a curing agent having functional groups reactive with the functional groups of the first reactant in (I);
(III) a latex emulsion comprising crosslinked polymeric microparticles dispersed in an aqueous continuous phase, the polymeric microparticles prepared from a monomer mix comprised of:
(a) at least 20 weight percent of a crosslinking monomer having two or more groups of reactive unsaturation and/or monomers having one or more functional groups capable of reacting to form crosslinks after polymerization;
(b) at least 2 weight percent of one or more polymerizable ethylenically unsaturated monomers having hydrophilic functional groups selected from the group consisting of(meth)acrylamide, hydroxyethy (meth)acrylate, hydroxypropyl(meth)acrylate, dimethylaminoethyl (meth)acrylate, allyl glycerol ether, methallyl glycerol ether and polyethyleneoxide allyl ether; and
(c) optionally, the balance comprised of one or more polymerizable ethylenically unsaturated monomers, wherein (a), (b) and (c) are different from each other; and (IV) an aqueous polyurethane dispersion, comprising polyurethane-acrylate particles dispersed in an aqueous medium, said particles comprising the reaction product obtained by polymerizing the components of a pre-emulsion formed from:
(A) an active hydrogen-containing polyurethane acrylate prepolymer, comprising a reaction product obtained by reacting:
  (i) a polyol;
  (ii) a polymerizable, ethylenically unsaturated monomer containing at least one hydroxyl group;
  (iii) a compound comprising a $C_1$–$C_{30}$ alkyl group having at least two active hydrogen groups selected from carboxylic acid groups and hydroxyl groups, wherein at least one active hydrogen group is a hydroxyl group; and
  (iv) a polyisocyanate;
(B) one or more hydrophobic polymerizable ethylenically unsaturated monomers; and
(C) a crosslinking monomer;

wherein the active hydrogen functional polyurethane acrylate prepolymer of (A) includes at least 30 percent by weight of polyurethane acrylate prepolymer comprising one or more prepolymers having at least one terminal polymerizable site of ethylenic unsaturation, at one end of the molecule and at least one active hydrogen-containing group at the opposite end of the molecule; and at least 10 percent by weight of the polyurethane acrylate prepolymer comprising one or more prepolymers having at least one terminal polymerizable site of ethylenic unsaturation at each end of the molecule.

* * * * *